US008435339B2

(12) United States Patent
Koyano et al.

(10) Patent No.: US 8,435,339 B2
(45) Date of Patent: May 7, 2013

(54) INK SET, INK CARTRIDGE, INKJET RECORDING METHOD, AND INKJET RECORDING APPARATUS

(75) Inventors: Masayuki Koyano, Zama (JP); Hiroshi Goto, Atsugi (JP); Tamotsu Aruga, Atsugi (JP); Kiyofumi Nagai, Machida (JP); Toshiroh Tokuno, Machida (JP)

(73) Assignee: Ricoh Company, Ltd., Tokyo (JP)

( * ) Notice: Subject to any disclaimer, the term of this patent is extended or adjusted under 35 U.S.C. 154(b) by 482 days.

(21) Appl. No.: 12/671,394

(22) PCT Filed: Sep. 18, 2008

(86) PCT No.: PCT/JP2008/067368
§ 371 (c)(1),
(2), (4) Date: Jan. 29, 2010

(87) PCT Pub. No.: WO2009/116197
PCT Pub. Date: Sep. 24, 2009

(65) Prior Publication Data
US 2010/0196602 A1    Aug. 5, 2010

(30) Foreign Application Priority Data
Mar. 19, 2008    (JP) .................................. 2008-070934

(51) Int. Cl.
*C09D 11/02* (2006.01)
*G01D 11/00* (2006.01)

(52) U.S. Cl.
USPC ................... 106/31.6; 106/31.27; 106/31.59; 106/31.89; 347/100

(58) Field of Classification Search ............... 106/31.27, 106/31.6, 31.59, 31.89
See application file for complete search history.

(56) References Cited

U.S. PATENT DOCUMENTS

| | | | |
|---|---|---|---|
| 6,613,136 B1 | 9/2003 | Arita et al. | |
| 6,670,409 B2* | 12/2003 | Yatake | 523/160 |
| 6,688,737 B2 | 2/2004 | Nagai et al. | |
| 6,695,443 B2 | 2/2004 | Arita et al. | |
| 6,730,155 B2 | 5/2004 | Gotoh et al. | |
| 6,786,588 B2 | 9/2004 | Koyano et al. | |
| 6,799,845 B2 | 10/2004 | Kaneko et al. | |
| 6,814,793 B2* | 11/2004 | Akers et al. | 106/31.6 |
| 6,979,365 B2* | 12/2005 | Tsuru et al. | 106/31.6 |
| 7,033,013 B2 | 4/2006 | Koyano et al. | |
| 7,407,537 B2* | 8/2008 | Ohira et al. | 106/31.27 |
| 7,479,180 B2* | 1/2009 | Vasudevan | 106/31.6 |
| 7,670,417 B2* | 3/2010 | Bhatt et al. | 106/31.6 |

(Continued)

FOREIGN PATENT DOCUMENTS

| | | |
|---|---|---|
| JP | 55 29546 | 3/1980 |
| JP | 56 57862 | 5/1981 |

(Continued)

*Primary Examiner* — Kaj K Olsen
*Assistant Examiner* — Veronica F Faison
(74) *Attorney, Agent, or Firm* — Oblon, Spivak, McClelland, Maier & Neustadt, L.L.P.

(57) ABSTRACT

An ink set includes at least two aqueous inks A and B with different colors, the inks A and B used in an inkjet recording method in which the inks A and B are superimposed for formation of a color image, wherein the ink A contains water-dispersible colorant A1 free of a surfactant-based dispersant, and anionic compound A2, and wherein the ink B contains water-dispersible colorant B1 containing a surfactant-based dispersant.

18 Claims, 3 Drawing Sheets

U.S. PATENT DOCUMENTS

| | | |
|---|---|---|
| 2002/0033869 A1 | 3/2002 | Kurabayashi et al. |
| 2004/0155946 A1 | 8/2004 | Nagai et al. |
| 2006/0057339 A1 | 3/2006 | Adachi et al. |
| 2007/0197685 A1 | 8/2007 | Aruga et al. |
| 2008/0273045 A1 | 11/2008 | Morohoshi et al. |
| 2009/0186162 A1 | 7/2009 | Namba et al. |

FOREIGN PATENT DOCUMENTS

| | | |
|---|---|---|
| JP | 60 23793 | 6/1985 |
| JP | 1 203483 | 8/1989 |
| JP | 4 372669 | 12/1992 |
| JP | 11 240145 | 9/1999 |
| JP | 2001 1553 | 1/2001 |
| JP | 2001 55533 | 2/2001 |
| JP | 2001 115069 | 4/2001 |
| JP | 2002 256187 | 9/2002 |
| JP | 2002 273888 | 9/2002 |
| JP | 2003 113337 | 4/2003 |
| JP | 2003 277657 | 10/2003 |
| JP | 2004 197055 | 7/2004 |
| JP | 2004 339489 | 12/2004 |
| JP | 2004 352996 | 12/2004 |
| JP | 2005 138504 | 6/2005 |
| JP | 3733149 | 10/2005 |

* cited by examiner

INK SET, INK CARTRIDGE, INKJET RECORDING METHOD, AND INKJET RECORDING APPARATUS

TECHNICAL FIELD

The present invention relates to an ink set used for an inkjet recording method where at least two aqueous inks with different colors are used to produce a composite color to form a color image, an inkjet recording method that uses the ink set for high-reliability recording, a reliability-maintaining method, an ink cartridge, and an inkjet recording apparatus.

BACKGROUND ART

Inkjet printers have the advantages of low noise and low running costs and thus are becoming widely available recently. Also, color inkjet printers capable of printing on regular paper are available in the market. However, it is still difficult to meet all of the requirements associated with color printing, including color reproducibility, water resistance, light resistance, dry fastness, feathering, bleeding, and ink discharge reliability. Two-color composite portions of two of red, green and blue colors are more likely to undergo quality degradation particularly where a color printer is used, although monochrome portions of yellow, magenta or cyan color do not undergo quality degradation in this case. In particular, when a printed image is to be dried without using any fixing device, the ink dry speed is increased by enhancing the ink permeability of paper (Patent Literature 1). With this approach, however, outstanding bleeding occurs in the printed image.

Patent Literature 2 discloses that ink containing dialkylsulfosuccinate as a surfactant increases the ink dry speed and thereby reduces image quality degradation. Unfortunately, the ink offers different dot diameters for different types of paper, significant image density reduction occurs, and when it is exposed to alkaline conditions, decomposition of the ink's activating agent occurs that results in the loss of the agent's effect during storage.

Patent Literature 3 discloses ink that contains strong basic substance. This ink is effective for rosin-sized acid paper, but not for paper manufactured using an alkylketenedimer or dialkylsulfosuccinate as a size agent. Moreover, even printed on acidic paper, this ink is not effective in two-color composite portions.

Patent Literature 4 discloses a recording liquid containing a polyalcohol derivative and pectin. Pectin is added as a thickener for the purpose of preventing bleeding. However, pectin is a non-ionic compound having hydroxyl groups as hydrophiilc groups and thus undesirably reduces the discharge stability after downtime of the printer. To overcome this problem, at present, multi-pass printing is employed upon color image printing so that the amount of ink that permeates paper is suppressed so as to attain increased image density. To achieve higher-speed printing, there is an attempt to suppress the level of ink that permeates paper along its thickness at positions where secondary colors are to be printed.

Patent Literatures 5-7 each disclose an improved ink set, wherein black pigment ink is employed as black ink to suppress its permeability to paper as well as to increase image density, and dye inks are employed as color inks with some degree of permeability to paper, whereby in a printed image color bleeding is avoided at boundaries between black and other colors. Neither of the inks can fully prevent bleeding when printed at high-speed; therefore, they are not satisfactory.

Patent Literature 8 discloses an ink set wherein an ink containing a pigment-based colorant undergoes aggregation or thickening by contact with an ink containing a dye-based colorant to prevent bleeding at color boundaries of image. Portions of image recorded using an dye-based ink are inferior in water resistance and light resistance to those recorded using a pigment-based ink, impairing the color balance over the entire image with time.

In Patent Literature 9, the inventors proposed an ink set that can provide a sharp color image by high-speed printing while preventing bleeding at color boundaries. However, there still remains a need to improve the ink set so that it can prevent bleeding and beeding when applied on regular paper with remarkably poor ink absorbability or on a coating medium with no aqueous ink-receiving layer.

To ensure ink discharge reliability of the recording head, Patent Literature 10 discloses employing ink surface tension $\gamma L$ which is smaller than the critical surface tension $\gamma L$ at the nozzle surface; Patent Literature 11 discloses using ink with a surface tension larger than the critical surface tension of a member surface; and Patent Literature 12 discloses a technology wherein the inner diameter of the ink discharge tube, ink surface tension, ink density, and waste ink thickness are specified.

With these proposals, it is still difficult to ensure sufficient discharge reliability for inks that have high pigment concentration or high solid content (high resin content) when mixed. An ink set system where inks thicken or aggregate by reaction upon mixed together requires a plurality of flow members in order to prevent unwanted blending of waste ink, thereby requiring a complicated mechanism.

Patent Literature 13 discloses a technology wherein both of the ink surface tension and adhesion tension between the ink and recording medium are specified for the purpose of improving the ink fixing property with respect to the recording medium.

The disclosed ink with improved fixing property is capable of ensuring storage stability when stored in a hermetically-sealed container. Nevertheless, the ink is not so stable in a system where ink vehicles are evaporated, such as in an open waste-flow path. Thus, there still remains a need to improve its discharge reliability.

[Patent Literature 1] Japanese Patent Application Laid-Open (JP-A) No. 55-29546
[Patent Literature 2] Japanese Patent Application Publication (JP-B) No. 60-23793
[Patent Literature 3] JP-A No. 56-57862
[Patent Literature 4] JP-A No. 01-203483
[Patent Literature 5] JP-A No. 2001-55533
[Patent Literature 6] JP-A No. 2004-339489
[Patent Literature 7] JP-A No. 2004-352996
[Patent Literature 8] JP-A No. 2004-197055
[Patent Literature 9] JP-A No. 2003-113337
[Patent Literature 10] JP-A No. 04-372669
[Patent Literature 11] JP-A No. 2002-273888
[Patent Literature 12] JP-A No. 2001-1553
[Patent Literature 13] Japanese Patent (JP-B) No. 3733149

DISCLOSURE OF INVENTION

An object of the present invention is to provide an ink set used for an inkjet recording method where at least two aqueous inks with different colors are used to produce a composite color to form a color image, the ink set capable high-speed printing of a sharp, high-resolution color image that has no bleeding at boundaries between two different colors on regular paper with remarkably poor ink absorbability or on a coating medium with no aqueous ink-receiving layer; an inkjet recording method using the ink set; an ink cartridge; and an ink recording apparatus.

The inventors conducted extensive studies to solve the foregoing problems in the art and accomplished the present invention. The present invention provides an ink set, inkjet recording method, ink cartridge, and inkjet recording apparatus described below.

<1> An ink set including:

at least two aqueous inks A and B with different colors, the inks A and B used in an inkjet recording method in which the inks A and B are superimposed for formation of a color image, wherein the ink A contains water-dispersible colorant A1 free of a surfactant-based dispersant, and anionic compound A2, and wherein the ink B contains water-dispersible colorant B1 containing a surfactant-based dispersant.

<2> The ink set according to <1>, wherein the colorant A1 is a water-insoluble self-dispersible coloring material or a poor water-soluble self-dispersible coloring material.

<3> The ink set according to <1>, wherein the colorant A1 is a polymer emulsion in which a water-insoluble coloring material and/or a poor water-soluble coloring material is contained in fine polymer particles.

<4> The ink set according to <2> or <3>, wherein the colorant A1 is a polymer emulsion in which a water-insoluble self-dispersible pigment or a poor water-soluble self-dispersible pigment is contained.

<5> The ink set according to any one of <1> to <4>, wherein the ink A is black ink, the anionic compound A2 is a water-soluble dye, and the ink B is color ink.

<6> The ink set according to any one of <1> to <5>, wherein the inks A and B undergo aggregation when homogenously mixed and retained at 25° C. for 60 minutes.

<7> The ink set according to any one of <1> to <6>, wherein the ink A and/or ink B is an aqueous ink which contains at least the water-dispersible colorant A1 and/or B1, a water-dispersible resin, a wetting agent, a penetrating agent, and water, the total amount of the water-dispersible colorant and water-dispersible resin in the ink is 12% by mass to 40% by mass on a solid basis, the amount of the wetting agent in the ink is 20% by mass to 35% by mass, and the ratio of solid content (R) of the water-dispersible resin to solid content (P) of a pigment in the water-dispersible colorant, (R/P), is 0.5 to 8.

<8> The ink set according to <7>, wherein the wetting agent contains at least one water-soluble organic solvent selected from the group consisting of glycerin, ethylene glycol, diethylene glycol, triethylene glycol, propylene glycol, dipropylene glycol, tripropylene glycol, 1,3-butanediol, 2,3-butanediol, 1,4-butanediol, 2-methyl-1,3-propanediol, 3-methyl-1,3-butanediol, 1,2-pentanediol, 1,5-pentanediol, 1,6-hexanediol, 2-methyl-2,4-pentanediol, polyethylene glycol, 1,2,6-hexanetriol, thiodiglycol, trimethylolpropane, meso-erythrytol, pentaerythrytol, xylitol, myo-inositol, maltitol, D-sorbitol, D-(−)-mannitol, 2-pyrrolidone, N-methyl-2-pyrrolidone, N-hydroxyethyl-2-pyrrolidone, ∈-caprolactam, 1,3-dimethyl-2-imidazolizinone, tetramethylurea, ethyleneurea, thiourea, and urea.

<9> The ink set according to claim <7> or <8>, wherein the penetrating agent contains at least one surfactant selected from the group consisting of acethylene glycol-based surfactants, polyoxyethylene alkyl ether-based surfactants, polyoxyethylene alkylphenyl ether-based surfactants, fluorine-based surfactants, and silicone-based surfactants.

<10> The ink set according to any one of <7> to <9>, wherein the penetrating agent contains at least one organic solvent selected from the group consisting of 1,2-hexanediol, 2-ethyl-1,3-hexanediol, ethylene glycol monohexyl ether, diethylene glycol monohexyl ether, ethylene glycol mono-2-ethylhexyl ether, diethylene glycol mono-2-ethylhexyl ether, 2-butyl-2-ethyl-1,3-β-hydroxyethoxypropane and polyoxyethylene-2-ethylhexyl ether, wherein the at least one organic solvent is water-soluble, and the total organic solvent amount is 0.1% by mass to 5% by mass.

<11> An inkjet recording method including:

forming on a recording medium a color image by using an ink set containing at least two aqueous inks A and B with different colors, the inks A and B superimposed on the recording medium, wherein the ink set is the ink set according to any one of <1> to <10>.

<12> The inkjet recording method according to <11>, wherein the recording medium has a Stoeckigt sizing degree of 3 seconds or more.

<13> The inkjet recording method according to claim <11> or <12>, wherein ink discharge is carried out by applying thermal energy to the ink.

<14> The inkjet recording method according to <11> or <12>, wherein ink discharge is carried out by applying mechanical energy to the ink.

<15> An ink cartridge including:

an ink container for containing an ink set, wherein the ink set is the ink set according to any one of <1> to <10>.

<16> An inkjet recording apparatus including:

an ink container for containing an ink set or an ink cartridge, wherein the ink set is the ink set according to any one of <1> to <10>.

<17> The inkjet recording apparatus according to <16>, wherein a mixed ink, prepared by mixing the inks of the ink set, has a surface tension γ of 30 mN/m or less, and an adhesion tension γ cos θ of the mixed ink with respect to a waste channel member through which the mixed ink is transferred to a waste holdup tank satisfies the relationship 15≦γ cos θ≦26, where γ is the surface tension of the mixed ink, and θ is the contact angle between the mixed ink and the waste channel member.

<18> The inkjet recording apparatus according to <17>, wherein the waste channel member has on its surface an ink repellant layer containing a silicone resin or fluorine resin.

<19> The inkjet recording apparatus according to any one of <16> to <18>, further including a reliability-maintaining mechanism for transferring the mixed ink to the waste holdup tank with a force greater than the adhesion force derived from the adhesion tension.

<20> The inkjet recording apparatus according to <19>, wherein the waste channel member of the reliability-maintaining mechanism is a rotator, and the mixed ink is separated from the waste channel member by means of the centrifugal force of the rotator.

<21> The inkjet recording apparatus according to <19> or <20>, wherein the reliability-maintaining mechanism fluidizes the mixed ink at a shear rate of $10^3$ (1/s) or more and transfers the fluidized mixed ink to the waste holdup tank.

<22>. The inkjet recording apparatus according to any one of <16> to <21>, further including a waste ink solid recovery mechanism in which a liquid content of the mixed ink is removed using a filter, and then a remnant containing solids is ejected to the outside of the inkjet recording apparatus.

EFFECTS OF THE INVENTION

As will be understood from the following detailed description, the present invention can provide an ink set having inks A and B, wherein the ink A contains water-dispersible colorant A1 free of a surfactant-based dispersant, and anionic compound A2, and wherein the ink B contains water-dispersible colorant B1 containing a surfactant-based dispersant, the ink set being capable of high-speed printing of a sharp, high-resolution color image that has no outstanding bleeding at boundaries between different colors on regular paper having remarkably poor ink absorbability or on a coating medium with no aqueous ink-receiving layer.

Inkjet recording has been widely employed that uses at least two aqueous inks with different colors to produce a composite color for the formation of a color image. With this method, when high-speed color printing is carried out on a recording medium (e.g., regular paper) using inks with high permeability to paper, it results in such troubles as those described above. The present invention overcome this problem and makes it possible to obtain images that have high density and sharpness and less show-through, even using inks with high permeability.

The present invention can provide an ink set having excellent storage stability and discharge reliability, by using ink A containing anionic compound A2 and either water-dispersible colorant A1 which is a polymer emulsion in which a water-insoluble coloring material and/or poor water-soluble coloring material is contained in fine polymer particles, or water-dispersible colorant A1 which is a water-insoluble self-dispersible coloring material or a poor water-soluble self-dispersible coloring material.

In the ink A, the ratio of the water-dispersible colorant A1 content to the anionic compound A2 content is preferably 100:1 to 5:1, more preferably 50:1 to 10:1.

If the A2 content is below the above range, the effect of preventing bleeding at boundaries between the inks A and B may not be obtained. On the other hand, if the A2 content exceeds the range, it may adversely affect the color tone of the ink A.

The present invention can provide an ink set that produces less bleeding at boundaries between black and color by using, as black ink, ink A that contains an aqueous dye as anionic compound A2, and as color ink, ink B. In addition, upon printing of black, color ink B is used in addition to black ink A, thereby providing a black image with excellent edge sharpness while ensuring ink dry speed.

The present invention can provide an ink set suitable for the formation of color image on regular paper by using a preferable combination of colorants for the ink set.

The present invention can ensure excellent image formation on regular paper by using inks in which the solid content, wetting agent amount, and solid content of water-dispersible resin with respect to colorants are specified so that the colorants tend to remain on the paper surface.

The present invention can provide an ink set with high reliability by using a specific wetting agent suitable for improving storage stability and discharge stability.

The prevent invention uses a specific type of surfactant suitable for improving wettability to paper, ensuring excellent image formation even on regular paper with remarkably poor ink absorbability or on a coating medium with no aqueous ink-receiving layer.

The prevent invention adds an organic solvent suitable for improving wettability to paper and imparting permeability, ensuring excellent image formation even on regular paper with remarkably poor ink absorbability or on a coating medium with no aqueous ink-receiving layer.

The inkjet recording method of the present invention uses the above ink set and thus can achieve high-speed printing of high-quality color image in which secondary colors are reproduced with high fidelity.

The present invention can provide an ink cartridge and inkjet recording apparatus, which include therein the above ink set and which are capable of high-speed color formation in which secondary colors are reproduced with high fidelity.

BEST MODE OF CARRYING OUT THE INVENTION

Figure 1:
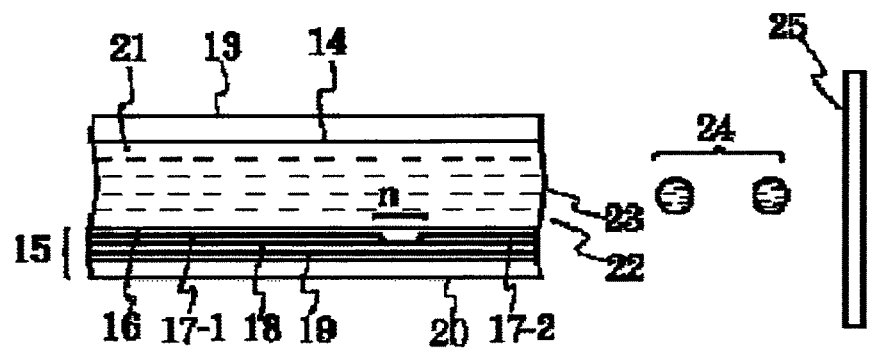
FIG. 1 is a cross sectional view of an example of a recording head.

Inkjet recording has been widely employed that uses at least two aqueous inks with different colors to produce a composite color for the formation of a color image. With this method, when high-speed color printing is carried out on a recording medium (e.g., regular paper) using inks with high permeability to paper, it results in such troubles as those described above. The present invention overcome this problem and makes it possible to obtain images that have high density and sharpness and less show-through, even using inks with high permeability.

As used herein, "ink set" refers to a combination of at least two inks with different colors. The inks are contained in their respective ink cartridges. A specific example of such an ink set is a combination of black ink and at least one color ink selected from yellow ink, magenta ink, and cyan ink. As a special color, red, green, blue, etc., and light-colored inks may be added. The total number of inks may be 2, 3, 4 or more.

Formation of a color image composed of at least two colors by use of an inkjet recording ink set (simply referred to as "ink set" in some cases) of the present invention encompasses color image formation (recording) by means of superimposition of at least two inks A and B. Inks A and B with different colors contain colorants corresponding to their colors. The ink set of the present invention contains at least two inks A and B, wherein ink A contains colorant A1 and ink B contains colorant B1. If the ink set is a combination of three inks A, B and C, the inks contain colorants A1, B1 and C1, respectively. If the ink set is a combination of four inks A, B, C and D, the inks contain colorants A1, B1, C1 and D1, respectively.

When a color image is to be formed (recorded) by superimposition of at least two inks A and B using the ink set of the present invention, ink A contains water-dispersible colorant A1 free of surfactant-based dispersant and contains anionic compound A2, and ink B contains water-dispersible colorant B1 containing a surfactant-based dispersant.

It is preferable that the two inks A and B used in the present invention be mutually compatible and undergo aggregation when homogenously mixed together and retained at 25° C. for 60 minutes. Aggregation of inks A and B can be confirmed by the presence of precipitates when centrifuged and by quantification using the spectrum of the supernatant. When a color image is formed by superimposition of inks A and B or when a color image is formed by adjacently applying inks A and B, the above characteristics prevent bleeding at color boundaries of the image and, in the case of secondary color, reduce show-through.

Colorant A1 in ink A used in the present invention is a water-dispersible colorant free of surfactant-based dispersant. The water-dispersible colorant is not particularly limited as long as it is prepared by dispersing a water-insoluble coloring material into water without using any surfactant-based dispersant. Specific examples include, for example, self-dispersible pigments, polymer dispersant-containing pigment dispersoids, anionic hydrophilic group-containing pigment dispersoids coated with polymer, and anionic hydrophilic group-containing pigment dispersoids. As the polymer dispersant, hydrophilic polymers are employed. Examples of the hydrophilic polymers include, for example, as naturally occurring polymers, vegetable polymers such as gum acacia, tragacanth gum, guar gum, karaya gum, locust bean gum, arabinogalactan, pectin and quince seed starch, sea weed polymers such as alginic acid, carrageenan and agar, animal polymers such as gelatin, casein, albumin and collagen, and microbial polymers such as xantene gum and dextran; as semi-synthetic polymers, cellulose polymers such as methylcellulose, ethylcellulose, hydroxyethylcellulose, hydroxypropylcellulose and carboxymethylcellulose, starch polymers such as sodium starch glycolate and sodium starch phosphate ester, and sea weed polymers such as sodium alginate and alginate propylene glycol ester; and as pure synthetic polymrers, vinyl polymers such as polyvinyl alcohol, polyvinyl pyrrolidone, and polyvinyl methyl ether; acrylic resins such as non-crosslinked polyacrylamide, polyacrylic acid or alkali metal salts thereof and water-soluble styrene-acryl copolymer resins; polymer compounds having the salt of the cationic functional group in the side chain, such as water-soluble styrene-maleic acid copolymer resins, water-soluble vinyl naphthalene-acryl copolymer resins, water-soluble vinyl naphthalene maleic acid copolymer resins, polyvinyl pyrrolidone, polyvinyl alcohol, alkali metal salts of β-naphthalene sulfonate formalin condensate and quaternary ammonium and amino groups, and natural polymers such as shellac. Among them, homopolymers obtained by polymerizing acrylic acid, methacrylic acid or styrene acrylate; and copolymers having carboxyl group obtained by copolymerizing monomers having other hydrophilic groups are particularly preferable. The polymer dispersant content of the ink is preferably 0.5 wt. % to 10 wt. %, more preferably 1 wt. % to 5 wt. %

Examples of the anionic hydrophilic group-containing pigment dispersoids coated with polymer include, for example, microcapsules in which pigment is covered with hydrophilic resin. The pigment may be partially or entirely covered with the resin.

As water-dispersible colorant A1, a polymer emulsion is suitably used in which a water-insoluble coloring material and/or a poor water-soluble coloring material is contained in fine polymer particles.

Ink B used in the present invention contains water-dispersible colorant B1 containing surfactant-based dispersant. As the surfactant-based dispersant, anionic surfactants such as polyoxyethylene alkyl ether phosphates and polyoxyethylene alkyl ether acetates, and nonionic surfactants such as nonylphenyl ether are used.

Suitable examples of anionic surfactants are those having HLB value of 10 to 20, with polyoxyethylene alkyl ether phosphates and polyoxyethylene alkyl ether acetates preferable. Suitable examples of nonionic surfactants are those having HLB value of 10 to 20, with polyoxyethylene-β-naphthylether, polyoxyethylenelaurylether, and polyoxyethylenestyrenephenylether preferable.

The colorant content of each ink used in the present invention is generally 0.1 wt. % to 20 wt. %, more preferably 0.2 wt. % to 8 wt. %. When the colorant content is less than 0.1 wt. %, it results in poor coloring ability even when they are used as light-colored inks. When the colorant content is greater than 20 wt. %, the ink viscosity becomes so high that it is difficult for the inks to be discharged from nozzles.

The water-dispersible colorant encompasses inorganic pigment particles, organic pigment particles, or fine particles whose surface has been colored with dye or pigment. The average particle diameter of such colorant is 10 nm to 300 nm, more preferably 60 nm to 120 nm.

As to the above fine particles whose surface has been colored with dye or pigment, the fine particles encompass metal oxide fine particles such as silica fine particles and alumina fine particles, in addition to fine polymer particles. Addition of such fine particles in the ink improves and coloring property and fixing property with respect to paper. It is preferable to use fine polymer particles when imparting glossiness. In particular, acrylic or polyester fine particles impregnated with dye or pigment, i.e., colored fine polymer particles having pigment or dye on the surface and/or in the inside are preferable. A more specific example is, for example, colored fine particles produced by the method disclosed in JP-A No. 2000-53898.

The following lists specific examples of pigments employable as colorants A1 and B1.

Pigments for the black ink include, for example, carbon blacks (C.I. Pigment Black 7) such as furnace black, lamp black, acetylene black and channel black; metals such as copper, iron (C.I. Pigment Black 11) and titanium oxide; and organic pigments such as aniline black (C.I. Pigment Black 1).

Pigments for the yellow ink include, for example, C.I. Pigment Yellow 1 (fast yellow G), 3, 12 (disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 128, 138, 150, 153, etc.

Pigments for the magenta ink include, for example, C.I. Pigment Red 1, 2, 3, 5, 17, 22 (brilliant fast scarlet), 23, 31, 38, 48:2 (Permanent Red 2B (Ba)), 48:2 (Permanent Red 2B (Ca)), 48:3 (Permanent Red 2B (Sr)), 48:4 (Permanent Red 2B (Mn)), 49:1, 52:2, 53:1, 57:1 (Brilliant Carmine 6B), 60:1, 63:1, 63:2, 64:1, 81 (Rhodamine 6G Lake), 83, 88, 92, 101 (colcothar), 104, 105, 106, 108 (cadmium red), 112, 114, 122 (dimethyl quinacridone), 123, 146, 149, 166, 168, 170, 172, 177, 178, 179, 185, 190, 193, 209, 219, etc.

Pigments for the cyan ink include, for example, C.I. Pigment Blue 1, 2, 15 (Copper Phthalocyanine Blue R), 15:1, 15:2, 15:3 (Phthalocyanine Blue G), 15:4, 15:6 (Phthalocyanine Blue E), 16, 17:1, 56, 60, 63. etc.

Pigments for intermediate colors for red, green and blue include, for example, C.I. Pigment Red 177, 194, 224, C.I. Pigment Orange 43, C.I. Pigment Violet 3, 19, 23, 37, C.I. Pigment Green 7 and 36, etc.

The carbon blacks are preferably those produced by the furnace method or channel method, which have a primary particle diameter of 15 nm to 40 nm, specific surface area of 50 m$^2$/g to 300 m$^2$/g as measured by the BET method, DBP oil absorption of 40 ml/100 g to 150 ml/100 g, and volatile content of 0.5% to 10%.

The above pigments may be used in the form of capsuled pigments or as pigments in which polymer is grafted, for the purpose of increasing the water dispersibility.

The anionic group-containing pigment used in the present invention can be prepared by anionic group-introducing treatment of the above carbon blacks and organic pigments, which have no anionic groups. Any known method can be employed as the anionic group-introducing treatment. For example, as a method of introduction of carboxylic group, for example, the material is reacted with an organic carboxylic acid having a halogen such as chlorine or bromine (e.g., monochloroacetate), or treated with nitric acid, hypochlorous acid or the like. As a method of introduction of sulfonic group, for example, the material is reacted with a sulfonating agent such as sulfuric acid, fuming sulfuric acid, or chlorosulfuric acid. As a method of introduction of phosphoric group, for example, the material is reacted with phosphoric acid. Furthermore the material is reacted with a diazonium compound for the introduction of carboxylic group or sulfonic group.

Preferred anionic group-containing carbon blacks used in the present invention include, for example, carboxylic group-containing carbon blacks prepared by treatment with hypochlorous acid, sulfonic group-containing carbon blacks prepared by treatment with sulfonating agent, and carboxylic group- or sulfonic group-containing carbon blacks prepared by treatment with a diazonium compound. The pH of the anionic group-containing carbon blacks (free acid) is 2 to 6, more preferably 4 to 6.

The pH used herein for colorants refers to a pH value of solution containing 1 g of colorant and 100 g of water, which solution was retained at 25° C. for 60 minutes.

As to the anionic group (e.g., carboxylic group or sulfonic group)-containing organic pigments used in the present invention, it is preferable to employ as a yellow pigment C.I Pigment Yellow 74, 128 or 138, neither of which contains a bentidine skeleton. As a magenta pigment, it is preferable to employ C.I. Pigment Red 122 or 209, which are quinacridone pigments. As a cyan colorant, C.I. Pigment Blue 15:3 (phthalocyanine compound), aluminum-coordinated phthalocyanine, or metal-free phthalocyanine is preferable. The pH of the organic pigment containing such anionic group (free acid) is 2 to 6, more preferably 4 to 6.

The anionic group-containing pigments used in the present invention are excellent in terms of dispersion stability and can be homogenously dispersed in water without using a dispersant such as a surfactant, lending themselves to use as so-called self-dispersible pigments.

The pigments used in the present invention have an average particle diameter of 10 nm to 300 nm, preferably 40 nm to 120 nm, more preferably 60 nm to 110 nm.

In ink A used in the present invention, anionic compound A2 contains an anionic group. The anionic group encompasses carboxylic group (COOH), sulfonic group (SO$_3$H), phosphoric group (H$_2$PO$_4$), phosphonic group (PO$_3$H$_2$), phenylsulfonic group (C$_6$H$_4$—SO$_3$H), phenylcarboxylic group (C$_6$H$_4$COOH), and so fourth. Preferred anionic groups are carboxylic group and sulfonic group. These groups can be in the form of free acid or salt. In the case of salt, water-soluble salts (e.g., sodium salt and potassium salt) are preferable. In view of the dispersion stability of water-dispersible colorant A1 added together with anionic compound A2, water-soluble anionic group-containing dyes are preferable. Such dyes encompass acidic dyes, basic dyes, reactive dyes, and food dyes. The dyes are classified into acidic dyes, direct dyes, basic dyes, reactive dyes, and food dyes according to their color index. Among these dyes, those with excellent water resistance and light resistance are preferable. The following lists specific examples of these dyes.

(Acidic Dyes and Food Dyes)

C.I. Acid Yellow 17, 23, 42, 44, 79 and 142; C.I. Acid Red 1, 8, 13, 14, 18, 26, 27, 35, 37, 42, 52, 82, 87, 89, 92, 97, 106, 111, 114, 115, 134, 186, 249, 254 and 289; C.I. Acid Blue 9, 29, 45, 92 and 249; C.I. Acid Black 1, 2, 7, 24, 26 and 94; C.I. Food Yellow 3 and 4; C.I. Food Red 7, 9 and 14; and C.I. Food Black 1 and 2, etc.

(Direct Dyes)

C.I. Direct Yellow 1, 12, 24, 26, 33, 44, 50, 86, 120, 132, 142 and 144; C.I. Direct Red 1, 4, 9, 13, 17, 20, 28, 31, 39, 80, 81, 83, 89, 225 and 227; C.I. Direct Orange 26, 29, 62 and 102; C.I. Direct Blue 1, 2, 6, 15, 22, 25, 71, 76, 79, 86, 87, 90, 98, 163, 165, 199 and 202; and C.I. Direct Black 19, 22, 32, 38, 51, 56, 71, 74, 75, 77, 154, 168 and 171, etc.

(Basic Dyes)

C.I. Basic Yellow 1, 2, 11, 13, 14, 15, 19, 21, 23, 24, 25, 28, 29, 32, 36, 40, 41, 45, 49, 51, 53, 63, 64, 65, 67, 70, 73, 77, 87 and 91; C.I. Basic Red 2, 12, 13, 14, 15, 18, 22, 23, 24, 27, 29, 35, 36, 38, 39, 46, 49, 51, 52, 54, 59, 68, 69, 70, 73, 78, 82, 102, 104, 109 and 112; C.I. Basic Blue 1, 3, 5, 7, 9, 21, 22, 26, 35, 41, 45, 47, 54, 62, 65, 66, 67, 69, 75, 77, 78, 89, 92, 93, 105, 117, 120, 122, 124, 129, 137, 141, 147 and 155; and C.I. Basic Black 2 and 8, etc.

(Reactive Dyes)

C.I. Reactive Black 3, 4, 7, 11, 12 and 17; Reactive Yellow 1, 5, 11, 13, 14, 20, 21, 22, 25, 40, 47, 51, 55, 65 and 67; C.I. Reactive red 1, 14, 17, 25, 26, 32, 37, 44, 46, 55, 60, 66, 74, 79, 96, 97 and 180; and C.I. Reactive Blue 1, 2, 7, 14, 15, 23, 32, 35, 38, 41, 63, 80 and 95, etc.

The present invention can particularly employ acid dyes and direct dyes. The present invention can also employ Projet™ series (Avecia KK), such as Projet Cyan 2, Projet Magenta 2 and Projet Yellow 2 as preferable dyes, which were developed as inkjet recording dyes. As colorant B1, it is possible to employ anionic group-containing dyes.

Colorant A1 contained in ink A used in the present invention can be an anionic group-containing pigment. Preferable examples of such a pigment include, for example, organic pigments such as azo pigments, phthalocyanine pigments, anthraquinone pigments, dioxadine pigments, indigo pigments, thioindigo pigments, perylene pigments, isoindolenone pigments, aniline black pigments azomethine pigments and rodamine B lake pigments, and carbon black pigments.

The inks used in the present invention can be prepared by dispersing or dissolving corresponding colorants in water. The ink containing a water-insoluble colorant (colorant dispersion) used in the present invention can be prepared by dispersing that colorant in water. This ink preferably contains a dispersant by which the water-insoluble colorant is homogenously dispersed in water. As the dispersant, a polymer dispersant or surfactant-based dispersant is used. As the polymer dispersant, hydrophilic polymers are employed. Examples of the hydrophilic polymers include, for example, as naturally occurring polymers, vegetable polymers such as gum acacia, tragacanth gum, guar gum, karaya gum, locust bean gum, arabinogalactan, pectin and quince seed starch, sea weed polymers such as alginic acid, carrageenan and agar, animal polymers such as gelatin, casein, albumin and collagen, and microbial polymers such as xantene gum and dextran; as semi-synthetic polymers, cellulose polymers such as methylcellulose, ethylcellulose, hydroxyethylcellulose, hydroxypropylcellulose and carboxymethylcellulose, starch polymers such as sodium starch glycolate and sodium starch phosphate ester, and sea weed polymers such as sodium alginate and alginate propylene glycol ester; and as pure synthetic polymrers, vinyl polymers such as polyvinyl alcohol, polyvinyl pyrrolidone, and polyvinyl methyl ether; acrylic resins such as non-crosslinked polyacrylamide, polyacrylic acid or alkali metal salts thereof and water-soluble styrene-acryl copolymer resins; polymer compounds having the salt of the cationic functional group in the side chain, such as water-soluble styrene-maleic acid copolymer resins, water-soluble vinyl naphthalene-acryl copolymer resins, water-soluble vinyl naphthalene maleic acid copolymer resins, polyvinyl pyrrolidone, polyvinyl alcohol, alkali metal salts of β-naphthalene sulfonate formalin condensate and quaternary ammonium and amino groups, and natural polymers such as shellac. Among them, homopolymers obtained by polymerizing acrylic acid, methacrylic acid or styrene acrylate; and copolymers having carboxyl group obtained by copolymerizing monomers having other hydrophilic groups are particularly preferable.

Examples of the surfactant-based dispersant include, for example, anionic surfactants such as polyoxyethylene alkyl ether phosphates and polyoxyethylene alkyl ether acetates, and nonionic surfactants such as nonylphenyl ether. The polymer dispersant content of the ink is 0.5 wt. % to 10 wt. %, more preferably 1 wt. % to 5 wt. %. The surfactant-based dispersant content of the ink is 0.1 wt. % to 10 wt. %, more preferably 0.5 wt. % to 5 wt. %.

In order to disperse water-insoluble colorant A1 upon preparation of ink A used in the present invention, it is preferable to use a polymer dispersant. On the other hand, in order to disperse water-insoluble colorant B1 upon preparation of ink B, it is preferable to use a surfactant-based dispersant.

The components used in the ink-media set of the present invention will be described in detail below.

<Ink>

—Colorant—

The ink used in the present invention can employ as a colorant pigment and dye, which may be used in combination.

At present, general inkjet recording liquids employ anionic dyes or anionic pigments. The components in the recording liquid are not specifically limited in the present invention. However, it is most effective to employ a combination of a recording liquid containing a general anionic colorant and a pre-treatment liquid containing a cationic compound.

The anionic component in the recording liquid is at least one colorant selected from anionic dyes, pigments or dyes dispersed using an anionic dispersant, anionic group-containing pigments, and anionic colored fine particles. In the ink the colorant has anionic groups as functional groups, or the anionic component is adsorbed on the colorant. For this reason, the anionic component and cationic resin are reacted, whereby the colorant component in the recording ink can be efficiently retained in the surface layer of the recording medium, leading to various image quality improvements, including increased image density, reduced show-through, and prevention of feathering and bleeding.

Anionic dyes are particularly preferable since the dye is fixed in the vicinity of the media surface by virtue of the pre-treatment liquid effect.

The pigment used in the recording liquid of the present invention is not particularly limited. For example, the following pigments can be suitably employed: organic pigments such as azo pigments, phthalocyanine pigments, anthraquinone pigments, quinacridone pigments, dioxadine pigments, indigo pigments, thioindigo pigments, perylene pigments, isoindolenone pigments, aniline black, azomethine pigments, rodamine B lake pigments and carbon blacks, and inorganic pigments such as titanium oxide, calcium carbonate, barium sulfate, aluminum hydroxide, barium yellow, iron blue pigment, cadmium red, chrome yellow, and metal powders. These pigments may be used in combination.

These pigments preferably have a particle diameter of 0.01 μm to 0.30 μm. When the particle diameter is less than 0.01 μm, the pigment is as small as dyes, resulting in reduced light resistance and in feathering. If the particle diameter is greater than 0.30 μm, it results in failure to attain discharge stability due to nozzle clogging and filter clogging in the printer.

Preferable carbon blacks used for black pigment ink are carbon blacks produced by the furnace method or the channel method, which having a primary particle diameter of 15 μm to 40 μm, a specific surface area of 50 $m^2/g$ to 300 $m^2/g$ by BET method, a DBP oil absorption of 40 mL/100 g to 150 mL/100 g, a volatile content of 0.5% to 10% and pH 2 to 9. Commercially available products of such carbon blacks are not particularly limited, can be optionally selected depending on the purpose, and include, for example, No. 2300, No. 900, MCF-88, No. 33, No. 40, No. 45, No. 52, MA7, MA8, MA100, No. 2200B (supplied from Mitsubishi Chemical Corporation); Raven 700, Raven 5750, Raven 5250, Raven 5000, Raven 3500 and Raven 1255 (supplied from Colombia); Regal 400R, Regal 330R, Regal 660R, MogulL, Monarch 700, Monarch 800, Monarch 880, Monarch 900, Monarch 1000, Monarch 1100, Monarch 1300 and Monarch 1400 (supplied from Cabot); Color Black FW1, Color Black FW2, Color Black FW2V, Color Black FW18, Color Black FW200, Color Black 5150, Color Black S160, Color Black 5170, Printex 35, Printex U, Printex V, Printex 140U, Printex 140V, Special Black 6, Special Black 5, Special Black 4A and Special Black 4 (supplied from Degussa).

Specific examples of color pigments include, for example organic pigments such as azo pigments, phthalocyanine pigments, anthraquinone pigments, quinacridone pigments, dioxadine pigments, indigo pigments, thioindigo pigments, perylene pigments, isoindolenone pigments, aniline black, azomethine pigments, rodamine B lake pigments and carbon blacks, and inorganic pigments such as titanium oxide, calcium carbonate, barium sulfate, aluminum hydroxide, barium yellow, iron blue pigment, cadmium red, chrome yellow, and metal powders.

Examples of pigments for yellow ink include, but not limited to, C.I. Pigment Yellow 1, 2, 3, 12, 13, 14, 16, 17, 73, 74, 75, 83, 93, 95, 97, 98, 114, 128, 129, 151 and 154.

Examples of pigments for magenta ink include, but not limited to, C.I. Pigment Red 5, 7, 12, 48 (Ca), 48 (Mn), 57 (Ca), 57:1, 112, 123, 168, 184, and 202.

Examples of pigments for cyan ink include, but not limited to, C.I. Pigment Blue 1, 2, 3, 15:3, 15:34, 16, 22, and 60, and C.I. Bat Blue 4 and 60. The pigments to be contained in the inks used in the present invention may be freshly prepared.

An inkjet recording liquid is prepared by dispersing the above pigment(s) in an aqueous medium using a polymer dispersant or surfactant. The dispersant for dispersing such organic pigment powder may be a general water-soluble resin or water-soluble surfactant.

Specific examples of the water-soluble resin include, for example, block copolymers, random copolymers and salts thereof, which are composed of at least two monomers selected from the group consisting of styrene, styrene derivatives, vinylnaphthalene derivatives, aliphatic alcohol esters of α,β-ethylenically unsaturated carboxylic acids, acrylic acid, acrylic acid derivatives, maleic acid, maleic acid derivatives, itaconic acid, itaconic acid derivatives, fumaric acid, fumaric acid derivatives, and the like. These water-soluble resins are alkali-soluble resins that can be dissolved in base-dissolved aqueous solution. Among them, those with a weight-average molecular weight of 3,000 to 20,000 are particularly preferable because when it is to be used for the preparation of inkjet recording liquid, it can be readily dispersed in an aqueous medium and the dispersion offers low viscosity.

A combined use of a polymer dispersant and a self-dispersible pigment is preferred for the purpose of obtaining an appropriate dot diameter. The reason for this is not clear, but the inventors contemplate as follows: The polymer dispersant suppresses permeation of ink into recording paper as well as aggregation of self-dispersible pigment particles, enabling the self-dispersible pigment particles to smoothly spread in horizontal direction and forming ideal dots—large, thin dots.

The following is a non-exclusive list of specific examples of a water-soluble surfactants applicable as a dispersant in the present invention.

Anionic surfactants such as higher fatty acid salts, alkyl sulfates, alkylether sulfates, alkylester sulfates, alkylarylether sulfates, alkyl sulfonates, sulfosuccinates, alkylallyl sulfonates and alkyl naphthalene sulfonates, alkyl phosphates, polyoxyethylene alky lether phosphates, and alkylallyl ether phosphates; cationic surfactants such as alkyl amines, dialkyl amines, tetraalkylammonium salts, benzalkonium salts, alkylpyridinium salts, and imidazolinium salts; and ampholytic surfactants such as dimethylalkyllauryl betaine, alkyl glycine, alkyldi(aminoethyl)glycine, and imidazolinium betain; nonionic surfactants such as polyoxyethylene alkyl ethers, polyoxyethylene alkylallyl ethers, polyoxyethylenepolyoxypropylene glycol, glycerin esters, sorbitan esters, sucrose esters, polyoxyethylene ether of glycerin esters, polyoxyethylene ether of sorbitan esters, polyoxyethylene ether of sorbitol esters, fatty acid alkanol amides, polyoxyethylene fatty acid amides, amine oxides, and polyoxyethylenealkylamines.

Dispersibility can also be imparted to the pigment by coating it with the resin having the hydrophilic group for microcapsulation.

As the method of microcapsulating the water-insoluble pigment by coating with an organic polymer, it is possible to use any method known in the art; examples are chemical production methods, physical production methods, physicochemical methods and mechanical production methods. Specifically, the following methods are included.

(1) Interface polymerization method (method in which two different monomers or two different reactants are dissolved separately in a dispersion phase and a continuous phase, and a wall membrane is formed by reacting them at their interface).

(2) In-situ polymerization method (method in which a wall membrane is formed by supplying liquid or gaseous monomers and a catalyst, or two reactive substances from any one side of a continuous phase nuclear particle side to cause a reaction).

(3) In-liquid cured coating method (method in which a wall membrane is formed by insolubilizing drops of a polymer solution containing a core substance particles by a curing agent in liquid).

(4) Coacervation (phase separation) method (method in which a wall membrane is formed by separating a polymer dispersion in which core substance particles have been dispersed into a coacervate (thick phase) in which a polymer concentration is high and a thin phase).

(5) In-liquid drying method (method in which a wall membrane is formed by preparing a liquid obtained by dispersing the core substance in the solution of a wall membrane substance, adding the dispersion into a liquid in which the continuous phase in this dispersion is not mixed to make a complex emulsion and gradually removing a medium which has dissolved the wall membrane substance).

(6) Melting dispersion cooling method (method in which a wall membrane is formed by utilizing a wall membrane substance which dissolves into a liquid form by heating and solidifies at ambient temperature, heating/liquefying this substance, dispersing core substance particles therein, making them fine particles and cooling).

(7) In-air suspension coating method (method in which a wall membrane is formed by suspending core substance particles of powder in air by fluid bed, and spraying/mixing a coating solution of the wall membrane substance with suspending in air flow).

(8) Spray drying method (method in which a wall membrane is formed by spraying a capsulated neat solution, contacting this with hot wind and evaporating/drying a volatile portion).

(9) Acid out method (method in which the solubility in water is imparted by neutralizing at least a part of an anionic group of an organic polymer compound containing the anionic group with a basic compound, the resulting compound is kneaded together with the coloring material in an aqueous solvent, subsequently the mixture is made neutral or acid with an acidic compound to precipitate the organic compound, which is then fixed to the coloring material, and then the solution is neutralized and dispersed).

(10) Phase inversion emulsification method (method in which a mixture containing an anionic organic polymer having a dispersibility in water and the coloring material are made an organic solvent phase, water is placed in the organic solvent phase or the organic solvent phase is placed in water).

Examples of the organic polymers (resins) used as the material which constitutes the wall membrane substance of the microcapsule include, for example, polyamides, polyurethanes, polyesters, polyureas, epoxy resins, polycarbonates, urea resins, melamine resins, phenol resins, polysaccharides, gelatin, gum acacia, dextran, casein, proteins, natural gums, carboxypolymethylene, polyvinyl alcohol, polyvinyl pyrrolidone, polyvinyl acetate, polyvinyl chloride, polyvinylidene chloride, cellulose, ethylcellulose, methylcellulose, nitrocellulose, hydroxyethylcellulose, acetate cellulose, polyethylene, polystyrene, polymers or copolymers of (meth)acrylic acid, polymers or copolymers of (meth)acrylate ester, (meth) acrylic acid-(meth)acrylate ester copolymers, styrene-(meth) acrylic acid copolymers, styrene-maleic acid copolymers, sodium alginate, fatty acid, paraffin, bee wax, water wax, cured beef tallow, carnauba wax and albumin.

Among them, it is possible to use the organic polymers having the anionic group such as carboxylic acid group and sulfonic acid group. The nonionic organic polymers include, for example, polyvinyl alcohol, polyethylene glycol monomethacrylate, polypropylene glycol monomethacrylate, methoxy polyethylene glycol monomethacrylate or (co) polymers thereof, and cation ring opening polymers of 2-oxazoline. Among them, completely saponified polyvinyl alcohol is particularly preferable because its water-solubility is low and it is easily dissolved in hot water whereas hardly dissolved in cold water.

The amount of the organic polymers which constitute the wall membrane of the microcapsule is preferably 1% by mass or more and 20% by mass or less relative to the water-insoluble coloring material such as organic pigments and carbon black. By making the amount of the organic polymers in the above range, it becomes possible to inhibit the decrease in color developing property of the pigment, caused by coating the pigment surface with the organic polymers because the content rate of the organic polymers is relatively low in the capsule. When the amount of the organic polymers is less than 1%, the effect of capsulation is hardly elicited. Conversely, when it exceeds 20% by mass, the color developing property of the pigment is remarkably decreased.

Considering other properties, it is more preferable that the amount of the organic polymers is in the range of 5% by mass to 10% by mass relative to the amount of the water-insoluble coloring material.

Since a part of the coloring material is not coated and is exposed, it becomes possible to inhibit the decrease of the color developing property. Since the part of the coloring material is substantially coated without being exposed, it becomes possible to simultaneously elicit the effect of the coated pigment. The number average molecular weight of the organic polymers used in the present invention is preferably 2,000 or more in terms of production of the capsule. As used herein, "substantially exposed" means not a partial exposure subsequent to defect such as pinhole and crack but the state of being intentionally exposed.

If the organic pigment which is the self-dispersible pigment or the self-dispersible carbon black is used as the coloring material, the dispersibility of the pigment is enhanced even when the content of the organic polymers is relatively low in the capsule. Thus, it is more preferable for the present invention because it becomes possible to assure the sufficient storage stability of the ink.

It is preferable to select a suitable organic polymer depending on the method of microcapsulation. For example, in the case of interface polymerization, polyesters, polyamides, polyurethane, polyvinyl pyrrolidone and epoxy resins are suitable. In the case by in-situ polymerization, polymers or copolymers of (meth)acrylic acid, (meth)acrylic acid-(meth) acrylate ester copolymers, styrene-(meth)acrylic acid copolymers, polyvinyl chloride, polyvinylidene chloride and polyamide are suitable. In the case of in-liquid curing, sodium alginate, polyvinyl alcohol, gelatin, albumin and epoxy resins are suitable. In the case of the coacervation method, gelatin, celluloses and casein are suitable. In order to obtain the fine and uniform microcapsulated pigment, it is possible, of course, to utilize all of the known methods of microcapsulation in addition to the above.

When the phase invasion method or the acid out method is selected as the method for microcapsulation, the anionic organic polymers are used as the organic polymers which constitute the wall membrane substance of the microcapsule. In the phase inversion method, a complex or a complex body of the anionic organic polymers having the self-dispersibility or solubility in water and the coloring material such as self-dispersible pigment or self-dispersible carbon black, or a mixture of the coloring material such as self-dispersible pigment or self-dispersible carbon black, the curing agent and the anionic organic polymers is made the organic solvent phase, the water is placed in the organic solvent phase or the organic solvent phase is placed in the water to make microcapsules with self-dispersing (phase inversion emulsification). In the above phase inversion method, it is no problem to produce by mixing the vehicle or the additive for the recording liquid in the organic solvent phase. Particularly, in terms of being capable of directly producing the dispersion for the recording liquid, it is more preferable to mix the liquid solvent for the recording liquid.

Meanwhile, in the acid out method, a hydrous cake is obtained by the production method including a step of neutralizing some or all of the anionic groups in the anionic group-containing organic polymer with a basic compound and kneading it with a coloring material such as a self-dispersible pigment or self-dispersible carbon black in an aqueous solvent; and a step of making pH neutral or acidic with an acidic compound to precipitate the anionic group-containing organic polymers, which are then fixed onto the pigment, and the hydrous cake is microcapsulated by neutralizing some or all of the anionic groups using a basic compound. In this way, it is possible to produce the water-based dispersion containing the fine anionic microcapsulated pigment comprising the pigment abundantly.

Examples of the solvent used upon the above microcapsulation include, for example, alkyl alcohols such as methanol, ethanol, propanol and butanol; aromatic hydrocarbons such as benzole, toluol and xylol; esters such as methyl acetate, ethyl acetate and butyl acetate; chlorinated hydrocarbons such as chloroform and ethylene dichloride; ketones such as acetone and methyl isobutyl ketone; ethers such as tetrahydrofuran and dioxane; cellsolves such as methyl cellsolve and butyl cellsolve. The microcapsule prepared by the above method is once separated from these solvents by centrifugation or filtration, and this is stirred with water and a required solvent, followed by re-dispersing to yield a recording liquid of interest used in the present invention. The average particle diameter of the capsulated pigments obtained by the above method is preferably 50 nm to 180 nm.

The scratch resistance of the printed matter can be improved by covering the pigment with resin so that the pigment is firmly attached to the printed matter.

<Additives to Pigment, Physical Properties of Ink>

In addition to the coloring material it is preferable to add a water-soluble organic solvent for the purpose of, for example, allowing the resulting ink to have desired physical properties, adjusting the ink wettability and permeability with respect to media, and preventing clogging of recording head nozzles due to drying. As the water-soluble organic solvent, wetting agents and penetrating agents are exemplified.

The wetting agent is added in order to prevent clogging of recording head nozzles due to drying. Specific examples of the wetting agent include, for example, polyalcohols such as ethylene glycol, diethylene glycol, triethylene glycol, tetraethylene glycol, polyethylene glycol, propylene glycol, 1,3-butandiol, 1,3-propandiol, 2-methyl-1,3-propandiol, 1,4-butandiol, 1,5-pentandiol, 1,6-hexandiol, glycerin, 1,2,6-hexantriol, 2-ethyl-1,3-hexandiol, 1,2,4-butantriol, 1,2,3-butantriol and petriol; polyalcohol alkyl ethers such as ethylene glycol monoethyl ether, ethylene glycol monobutyl ether, diethylene glycol monomethyl ether, diethylene glycol monoethyl ether, diethylene glycol monobutyl ether, triethylene glycol monobutyl ether, tetraethylene glycol monomethyl ether, and propylene glycol monoethyl ether; polyalcohol aryl ethers such as ethylene glycol monophenyl ether and ethylene glycol monobenzyl ether; nitrogen-containing heterocyclic ring compounds such as N-methyl-2-pyrrolidone, N-hydroxyethyl-2-pyrrolidone, 2-pyrrolidone, 1,3-dimethylimidazolidinone, and $\in$-caprolactam; amides such as formamide, N-methylformamide, and N,N-dimethylformamide; amines such as monoethanolamine, diethanolamine, triethanolamine, monoethylamine, diethylamine, and triethylamine; sulfur-containing compounds such as dimethylsulfoxide, sulfolan, and thiodiethanol; tetramethylurea; propylene carbonate; ethylene carbonate; and γ-butyrolactone. These solvents are used alone or in combination, together with water.

The penetrating agent is added to increase the ink wettability to recording media and to adjust the ink penetrating speed. When printing on a print sheet, it is preferable to employ a penetrating agent with a low surface tension and high levelling ability. In this case it is preferable to employ at, least surfactant selected from silicone-based surfactants and fluorine-based surfactants, with fluorine-based surfactants particularly preferable.

It is preferable to use a fluorine-based surfactant in which the number of carbon atoms substituted with a fluorine atom is 2 to 16, more preferably 4 to 16. If the number of fluorine-substituted carbon atoms is less than 2, it may result in failure to obtain effects of fluorine atom. If the number is greater than 16, it may result in poor ink storage stability.

Examples of the fluorine-based surfactant include, for example, perfluoroalkyl sulfonate compounds, perfluoroalkyl carboxylate compounds, perfluoroalkyl phosphate compounds, perfluoroalkyl ethylene oxide adducts, and polyoxyalkylene ether polymer compounds having perfluoroalkyl ether group in the side chain. Among them, the polyoxyalkylene ether polymer compounds are particularly preferable for their low foaming ability.

Examples of the perfluoroalkyl sulfonate compounds include, for example, perfluoroalkyl sulfonate and perfluoroalkyl sulfonate salts.

Examples of the perfluoroalkyl carboxylate compounds include, for example perfluoroalkyl carboxylates and perfluoroalkyl carboxylate salts.

Examples of the perfluoroalkyl phosphate compounds include, for example perfluoroalkyl phosphates and perfluoroalkyl phosphate ester salts.

Examples of the polyoxyalkylene ether polymer compounds having the perfluoroalkyl ether group in the side chain include, for example, polyoxyalkylene ether polymers having perfluoroalkyl ether group in the side chain, sulfate salts of the polyoxyalkylene ether polymers, and salts of the polyoxyalkylene ether polymers.

Counterions of the salts in these fluorine-based surfactants include Li, Na, K, $NH_4$, $NH_3CH_2CH_2OH$, $NH_2(CH_2CH_2OH)_2$, and $NH(CH_2CH_2OH)_3$.

As the fluorine based-surfactants, those appropriately synthesized may be used, or commercially available products may be used.

Examples of the commercially available products include Surflon S-111, S-112, S-113, S-121, S-131, S-132, S-141, S-145 (supplied from Asahi Glass Co., Ltd.), Fullard FC-93, FC-95, FC-98, FC-129, FC-135, FC-170C, FC-430, FC-431 (supplied from Sumitomo 3M Ltd.), Megafac F-470, F1405, F-474 (Dainippon Ink And Chemicals, Incorporated), Zonyl TBS, FSP, FSA, FSN-100, FSN, FSO-100, FSO, FS-300, UR (supplied from DuPont), FT-110, FT-250, FT-251, FT-400S, FT-150, FT-400SW (Neos Corporation) and PF-151N (Omnova Inc.). Among them, FT-110, FT-250, FT-251, FT-400S, FT-150, FT-400SW supplied from Neos Corporation and PF-151N supplied from Omnova Inc. are particularly preferable in terms of good printing quality, particularly remarkably enhancing the color forming property and the evenly staining property for the paper.

Specific examples of the fluorine based-surfactant are preferably those represented by the general formulas shown below.

(1) Anionic Fluorine-Based Surfactant

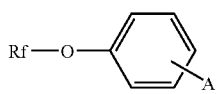

where Rf represents a mixture of fluorine containing hydrophobic groups represented by the following structural formulas, and A represents $—SO_3X$, $—COOX$ or $—PO_3X$ (where X is counteranion, specifically includes hydrogen atom, Li, Na, K, $NH_4$, $NH_3CH_2CH_2OH$, $NH_2(CH_2CH_2OH)_2$, or $NH(CH_2CH_2OH)_3$).

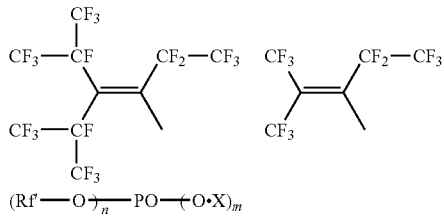

where Rf' represents a fluorine containing group represented by the following structural formula. X is the same defined as the above, n represents an integer of 1 or 2, and m represents 2-n.

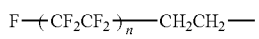

where n represents an integer of 3 to 10.

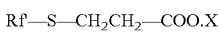

where Rf' and X are the same as defined above.

where Rf' and X are the same as defined above.

(2) Nonionic Fluorine-Based Surfactant

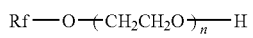

where Rf is the same as defined above, and n represents an integer of 5 to 20.

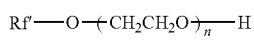

where Rf' is the same as defined above, and n represents an integer of 1 to 40.

(3) Ampholytic Fluorine-Based Surfactant

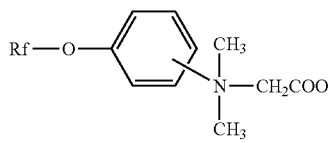

where Rf is the same as defined above.

(4) Oligomer Type Fluorine-Based Surfactant

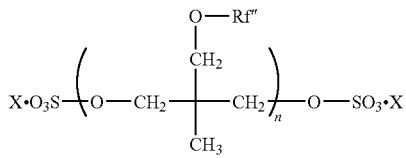

where Rf' represents the fluorine containing group represented by the following structural formula, n represents an integer of 0 to 10, and X is the same as defined above.

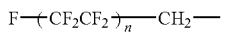

where n represents an integer of 1 to 4.

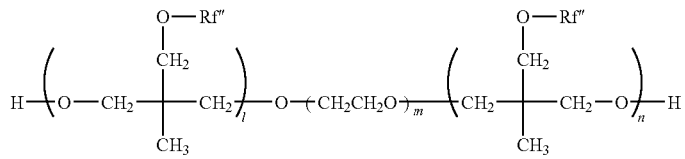

where Rf' is the same as defined above, l, m, and n each represent an integer of 0 to 10.

The silicone based-surfactant is not particularly limited and can be appropriately selected depending on the purpose, and includes, for example, polydimethylsiloxane with modified side chain, polydimethylsiloxane with modified both ends, polydimethylsiloxane with modified one end and polydimethylsiloxane with modified side chain and both ends. As a modifying group, those having polyoxyethylene group or polyoxyethylene polyoxypropylene group are particularly preferable because they exhibit good natures as aqueous surfactants.

As such a surfactant, those appropriately synthesized may be used, or commercially available products may be used.

The commercially available products can be easily obtained from, for example, BYK Chemie GmbH, Shin-Etsu Silicones Co., Ltd., and Dow Corning Tray Co., Ltd.

The polyether-modified silicone-based surfactant is not particularly limited and can be appropriately selected depending on the purpose; examples are, for example compounds in which the polyalkyleneoxide structure is introduced in the Si side chain of dimethylpolysiloxane.

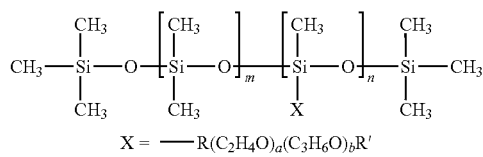

where m, n, a, and b each represent an integer; and R and R' each represent an alkyl or alkylene group.

Commercially available products can be used as the polyether-modified silicone compound; examples thereof are KF-618, KF-642 and KF-643 (Shin-Etsu Chemical, Co., Ltd.).

In addition to the fluorine-based surfactants and anionic surfactants, nonionic surfactants, ampholytic surfactants, etc., can be employed.

Examples of the anionic surfactants include, for example, polyoxyethylene alkyl ether acetates, dodecyl benzene sulfonates, laurates and polyoxyethylene alkyl ether sulfate salts.

Examples of the nonionic surfactants include, for example, acethylene glycol-based surfactants, polyoxyethylene alkyl ethers, polyoxyethylene alkylphenyl ethers, polyoxyethylene alkyl ethers, polyoxyethylene alkyl ester, and polyoxyethylene sorbitan fatty acid esters.

Examples of the acetylene glycol-based surfactant include, example, 2,4,7,9-tetramethyl-5-decine-4,7-diol, 3,6-dimethyl-4-octine-3,6-diol and 3,5-dimethyl-1-hexine-3-ol. The acetylene glycol based surfactant includes Surfynol 104, 82, 465, 485, and TG supplied from Air Products (USA) as the commercially available products.

Examples of the ampholytic surfactants include, for example, laurylamino propionate, lauryldimethylbetaine, stearyldimethylbetaine and lauryldihydroxyethylbetaine.

Specifically, lauryldimethylamine oxide, myristyldimethylamine oxide, stearyldimethylamine oxide, dihydroxyethyllaurylamine oxide, polyoxyethylene palm oil alkyldimethylamine oxide, dimethylalkyl(palm)betaine and dimethyllaurylbetaine.

These surfactants are available from Nikko Chemicals Co., Ltd., Nippon Emulsion Co., Ltd., Nippon Shokubai Co., Ltd., Toho Chemical Industry Co., Ltd., Kao Corporation, Adeka Co., Ltd., Lion Corporation, Aoki Oil Industrial Co., Ltd., Sanyo Chemical Industries, Ltd, etc.

The surfactants are not limited to those listed above, and may be used alone or in combination. When a single surfactant is not easily dissolved in a recording liquid, it can be dissolved by mixing with another surfactant.

Among these surfactants, the nonionic surfactants represented by the following structural formulas 1-5 are suitable.

$R^1-O-(CH_2CH_2O)_h-R^2$  Structural Formula 1 where $R^1$ represents a linear or branched C6-14 alkyl group, or a linear or branched C6-14 perfluoroalkyl group; $R^2$ represents a hydrogen atom or a linear or branched C1-4 alkyl group; and h represents an integer of 5 to 20.

$R^1-COO-(CH_2CH_2O)_h-R^2$  Structural Formula 2 where $R^1$ represents a linear or branched C6-14 alkyl group; $R^2$ represents a hydrogen atom or a linear or branched C1-4 alkyl group; and h represents an integer of 5 to 20.

Structural Formula 3

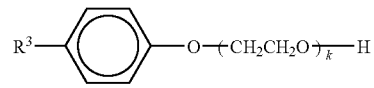

where $R^3$ represents a hydrocarbon group and is, for example, a linear or branched C6-14 alkyl group; and k represents an integer of 5 to 20.

Structural Formula 4

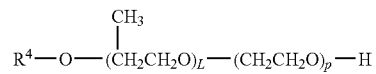

where $R^4$ represents a hydrocarbon group and for example represents a linear or branched C6-14 alkyl group; L represents an integer of 5 to 10; and p represents an integer of 5 to 20. A propylene glycol chain and an ethylene glycol chain may undergo block polymerization or random polymerization.

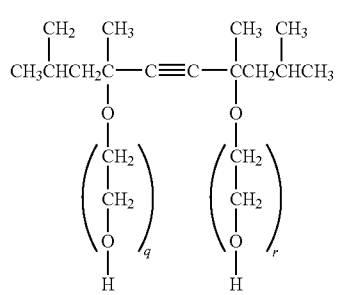

Structural Formula 5 where q and p each represent an integer of 5 to 20.

The surfactant content of the recording ink is preferably 0.01% by mass to 3.0% by mass and more preferably 0.5% by mass to 2% by mass. The total amount of liquid components which are liquid at 25° C. and which have higher boiling points than water is 15% by mass or less. When the content is less than 0.01% by mass, the effect of the added surfactant is lost in some cases. When it exceeds 3.0% by mass, the permeability into the recording medium becomes unnecessarily high, and the reduction of image density or the show through occur in some cases.

The viscosity of the recording liquid of the present invention is preferably 1.0 cp to 20.0 cp, but more preferably 3.0 cp to 10.0 cp in view of ink discharge stability.

The pH of the recording liquid of the present invention is 3 to 11, but more preferably 6 to 10 in view of preventing corrosion of metal members which the recording liquid contacts.

The recording liquid of the present invention may contain an antiseptic/anti-fungal agent. This prevents growth of fungi in the recording ink. Examples thereof include, for example, benzotriazole, sodium dehydroacetate, sodium sorbate, sodium 2-pyridinethiol-1-oxide, isothiazoline compounds, sodium benzoate, and sodium pentachlorophenol.

The recording liquid of the present invention can contain an antirust agent. This prevents corrosion of metal members (e.g., recording head) by forming a coat thereon. Examples thereof include, for example, acidic sulfite, sodium thiosulfate, thiodiglycolic acid ammonium, diisopropylammonium nitrate, pentaerythritol tetranitrate, and dicyclohexylammonium nitrate.

The recording ink of the present invention may contain an antioxidant. Even when radicals that cause corrosion have yielded, the agent eliminate the radicals and thereby prevents corrosion. Representative examples of the antioxidant include, for example, phenol compounds and amine compounds. Examples of the phenol compound include, for example, hydroquinones, galate compounds, and hindered phenol compounds such as 2,6-di-tert-butyl-4-p-cresol, stearyl-β-(3,5-di-tert-butyl-4-hydroxyphenyl)propionate, 2,2'-methylene bis(4-methyl-6-tert-butylphenol), 2,2'-methylene bis(4-ethyl-6-tert-butylphenol), 4,4'-thiobis bis(3-methyl-6-tert-butylphenol), 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, tris(3,5-di-tert-butyl-4-hydroxybenzyl)isocyanurate, and tetraxis[metyylene-3-(3',5'-di-tert-butyl-4-hydroxyphenyl)propionate]methane. Examples of the amine compound include, for example, N,N'-diphenyl-p-phenylenediamine, phenyl-β-naphthylamine, phenyl-α-naphthylamine, N,N'-β-naphthyl-p-phenylenediamine, N,N'-diphenylethylenediamine, phenothiazine, N,N'-di-sec-butyl-p-phenylenediamine, and 4,4'-tetramethyl-diaminodiphenylmethane. Additional representative examples of the latter include, for example, sulfur-based compounds and phosphorous-based compounds. Examples of the sulfur-based compound include, for example, dilaurylthiodipropionate, distearyl thiodipropionate, lauryl stearyl thiodipropionate, dimyristyl thiodipropionate, distearyl β,β'-thiodibutylate, 2-mercaptobenzimidazole, and dilauryl sulfide. Examples of the phosphorous-based compound include, for example, triphenyl phosphite, trioctadecyl phosphite, triodecyl phosphite, trilauryl trithiophosphite, diphenylisodecyl phosphite, trinonylphenyl phosphite, and distearyl pentaerythritol phosphite.

The recording ink of the present invention can contain a pH adjuster. Examples thereof include, for example, alkali metal hydroxides such as lithium hydroxide, sodium hydroxide and potassium hydroxide, ammonium hydroxide, quaternary ammonium hydroxide, quaternary phosphonium hydroxide, alkali metal carbonates such as lithium carbonate, sodium carbonate and potassium carbonate, amines such as diethanolamine and triethanol amine, boric acid, hydrochloric acid, nitric acid, sulfuric acid, and acetic acid.

—Water-Dispersible Resin—

The water-dispersible resin is not particularly limited and can be appropriately selected depending on the purpose. Fine resin particles are preferable, since the amount of resin added can be increased.

In the production of ink, there is used a resin emulsion where the fine resin particles are dispersed in water (continuous phase). If necessary, the resin emulsion may contain a dispersant such as a surfactant.

In general, the fine resin particles (dispersed phase) content of the resin emulsion is preferably 10% by mass to 70% by mass.

The fine resin particles preferably have a volume average particle diameter of 10 nm to 1,000 nm, more preferably 100 nm to 300 nm, considering that the resin emulsion is used in, among others, inkjet recording apparatus. Notably, the above-described particle diameter refers to that of the fine resin particles present in the resin emulsion, but a stable recording ink is almost identical to the resin emulsion in relation to the particle diameter of the fine resin particles contained therein. As the particle diameter becomes large, the amount of the emulsion added can be increased. When the volume average particle diameter is less than 100 nm, the amount of the emulsion added may not be increased; whereas when the volume average particle diameter is more than 300 nm, the reliability may decrease. Also, emulsions containing fine resin particles with an average particle diameter outside the above range may be used in some cases. The above is a general description, not depending on the type of emulsion.

The volume average particle diameter can be measured with, for example, a particle size distribution analyzer (Microtrack MODEL UPA9340, product of NIKKISO, CO., LTD.).

Specifically, an aqueous emulsion is diluted so that the signal level falls within an optimal range, and then measured under the following conditions: transparency-YES, tentatively, Reflective Index 1.49, Partial Density 1.19, Spherical Particles-YES, and medium-water. Here, a value of 50% was defined as the volume average particle diameter.

The fine resin particles (dispersed phase) are not particularly limited and can be appropriately depending on the purpose. Examples thereof include urethane resins, polyester resins, acrylic resins, vinyl acetate resins, styrene resins, butadiene resins, styrene-butadiene resins, vinyl chloride resins, acrylic/styrene resins and acrylic silicone resins.

The resin emulsion used may be appropriately synthesized or may be a commercially available product.

Examples of the commercially available resin emulsion include Micro Gel E-1002, E-5002 (styrene-acrylic resin emulsion, product of NIPPON PAINT Co., Ltd.), Boncoat 4001 (acrylic resin emulsion, product of Dainippon Ink and Chemicals Inc.), Boncoat 5454 (styrene-acrylic resin emulsion, product of Dainippon Ink and Chemicals Inc.), SAE-1014 (styrene-acrylic resin emulsion, product of ZEON CORPORATION), Saibinol SK-200 (acrylic resin emulsion, product of Saiden Chemical Industry Co., Ltd.), Primal AC-22, AC-61 (acrylic resin emulsion, product of Rohm and Haas Company), NANOCRYL SBCX-2821, 3689 (acrylic silicone resin emulsion, product of TOYO INK MFG. CO. LTD.), and #3070 (methyl methacrylate polymer resin emulsion, product of Mikuni Color Ltd.).

Of these, acrylic silicone emulsions are particularly preferable from the viewpoint of exhibiting excellent fixing property.

The resin component contained in the acrylic silicone emulsion preferably has a glass transition temperature of 25° C. or lower, more preferably 0° C. When the glass transition temperature is higher than 25° C., resin itself becomes brittle to cause poor fixing property. In particular, the fixing property may drop in use of a smooth printing paper that is difficult to absorb water. Also, resins with a glass transition temperature of 25° C. or higher can be used in some cases.

The glass transition temperature can be measured with, for example, a differential scanning calorimeter (product of Rigaku Corporation).

Specifically, the temperature of a resin piece, which had been obtained by drying the aqueous resin emulsion at ambient temperature, was raised from around −50° C. using a Rigaku Denki differential scanning calorimeter, and the temperature at which the level was changed was defined as the glass transition temperature.

The inks used in the present invention contain water as a liquid medium. Also, a water-soluble organic solvent may be used in combination with water for imparting desired physical properties to the ink, for preventing the ink from drying, and for increasing dissolution stability of water-soluble components. Examples of the organic solvent include polyhydric alcohols such as ethylene glycol, diethylene glycol, tiethylene glycol, polyethylene glycol, polypropylene glycol, 1,3-propanediol, 1,3-butanediol, 1,4-butanediol, 1,5-pentanediol, 1,6-hexanediol, glycerin, 1,2,6-hexanetriol, 1,2,4-butanetriol, 1,2,3-butanetriol and petriol; polyhydric alcohol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether and propylene glycol monoethyl ether; polyhydric alcohol aryl ethers such as ethylene glycol monophenyl ether and ethylene glycol monobenzyl ether; nitrogen-containing heterocyclic compounds such as N-methyl-2-pyrrolidone, N-hydroxyethyl-2-pyrrolidone, 2-pyrrolidone, 1,3-dimethylimidazolizinone and ∈-caprolactam; amides such as formamide, N-methylformamide, and N,N-dimethylformamide; amines such as monoethanolamine, diethanolamine, triethanolamine, monoethylamine, diethylamine and triethylamine; sulfur-containing compounds such as dimethylsulfoxide, sulfolane and thiodiethanol; propylene carbonate; ethylene carbonate; and γ-butylolactone. These solvents may be used alone or in combination.

Among them, particularly preferable are glycerin, ethylene glycol, diethylene glycol, triethylene glycol, propylene glycol, dipropylene glycol, tripropylene glycol, 1,3-butanediol, 2,3-butanediol, 1,4-butanediol, 2-methyl-1,3-propanediol, 3-methyl-1,3-butanediol, 1,2-pentanediol, 1,5-pentanediol, 1,6-hexanediol, 2-methyl-2,4-pentanediol, polyethylene glycol, 1,2,6-hexanetriol, thiodiglycol, trimethylolpropane, meso-erythrytol, pentaerythrytol, xylitol, myo-inositol, maltitol, D-sorbitol, D-(−)-mannitol, 2-pyrrolidone, N-methyl-2-pyrrolidone, N-hydroxyethyl-2-pyrrolidone, ∈-caprolactam, 1,3-dimethyl-2-imidazolizinone, tetramethylurea, ethyleneurea, thiourea and urea. Use of these solvents can effectively offer high dissolution of the components and prevention of inkjet failure due to water evaporation.

Examples of the permeating agent which is added for adjusting the surface tension in addition to the surfactant include polyhydric alcohol alkyl/aryl ethers such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether, triethylene glycol monobutyl ether and tetraethylene glycol chlorophenyl ether; diols such as 2-ethyl-1,3-hexanediol, 2,2,4-trimethyl-1,3-pentanediol and 2,2-dimethyl-1,3-propanediol; polyoxyethylene-polyoxypropylene block copolymers; fluorine surfactants; and lower alcohols such as ethanol and 2-propanol. Among them, particularly preferable are 1,2-hexanediol, 2-ethyl-1,3-hexanediol, ethylene glycol monohexyl ether, diethylene glycol monohexyl ether, ethylene glycol mono-2-ethylhexyl ether, diethylene glycol mono-2-ethylhexyl ether, 2-butyl-2-ethyl-1,3-β-hydroxyethoxypropane and polyoxyethylene-2-ethylhexyl ether. Use of diols is preferable since water-insoluble colorants do not easily aggregate. The amount of the permeating agent added, which varies with its type and physical properties, is 0.1 wt. % to 20 wt. %, preferably 0.1 wt. % to 5.0 wt. %. When the amount is less than the lower limit, permeability becomes insufficient; whereas when the amount is equal to or more than the upper limit, droplet formation may be adversely affected and dispersion stability of water-dispersible colorants may be impaired. Addition of them improves wettability to inkjet head members and recording equipment, causing increased degree of ink-filling to suppress occurrence of recording failure due to air bubbles.

The ink in the present invention can be appropriately adjusted in its physical properties (e.g., surface tension) by use of a system therefor. As used herein, "surface tension of ink" is indicative of permeability to paper. Specifically, ink permeability corresponds to a value of dynamic surface tension measured within 1 sec after formation of an ink droplet on the paper surface. The measuring method may be any conventionally known method, so long as the dynamic surface tension within 1 sec can be measured. For example, the method described in JP-A No. 63-312372 can be used. Preferably, the surface tension is a value of 50 mN/m or lower, more preferably 40 mN/m or lower. When the value is 40 mN/m or lower, excellent drying speed can be attained. Meanwhile, from the viewpoint of ink discharge stability, too low dynamic surface tension tends to cause unstable droplet formation. The dynamic surface tension allowing stable discharge is preferably 40 mN/m or higher in 1 msec. The above-described surface tension is "dynamic surface tension", which is different from "static surface tension" referred in the section of "reliability-maintaining mechanism" given below. The viscosity of the ink is appropriately selected from 1 mPa·s to 10 mPa·s depending on the discharge method. The ink contains pigment particles with a particle diameter of 10 nm to 300 nm, and the average particle diameter is preferably 60 nm to 120 nm. The solid content of the ink is 1 wt. % to 25 wt. %, and the water content thereof is 25 wt. % to 93 wt. %, more preferably 50 wt. % to 80 wt. %.

In the present invention, in consideration of, for example, the zeta potential (ζ potential) on the surfaces of pigment particles or colored fine particles contained in the ink, the conductivity of the ink is adjusted to fall within a range of 1 mS/cm to 6 mS/cm. In this range, the dispersion stability of the ink is not impaired and unfavorable phenomena such as aggregation of pigment particles do not occur, making it possible to obtain the highly reliable ink exhibiting small change in particle diameter over a long period of time. In order for the ink to have a conductivity falling within the above range, a conductivity adjuster or the like is generally added. In addition, through controlling the amount of a quaternary ammonium salt contained in ink B, the conductivity can be adjusted to fall within a desired range, since the quaternary ammonium salt has a dissociative group. Further, a conductivity adjuster that does not inhibit colorant dispersion may be added for fine adjustment. Preferable examples of the conductivity adjuster include quaternary ammonium salts (e.g., tetramethylammonium chloride) and alkanolamine salts.

The ink used in the present invention may contain a conventionally used auxiliary agent. Examples thereof include antiseptic/antifungal agents, pH adjusters, chelating agents and anticorrosion agents. Examples of the antiseptic/antifungal agent include dehydro sodium acetate, sodium sorbinate, sodium 2-pyridinethiol-1-oxide, sodium benzoate, sodium pentachlorophenol and isothiazoline. The pH adjuster may be any substance, so long as it can adjust the pH of the ink formulation to fall within a desired range without giving any adverse effect thereto. Examples thereof include amines such as diethanolamine and triethanolamine; alkali metal hydroxides such as lithium hydroxide and sodium hydroxide; ammonium hydroxide; quaternary ammonium hydroxide; quaternary phosphonium hydroxide; and alkali metal carbonate such as lithium carbonate, sodium carbonate and potassium carbonate.

Examples of the chelating agent include sodium ethylenediaminetetraacetate, sodium nitrilotriacetate, sodium hydroxyethylethylenediaminetriacetate, sodium diethylenetriamine pentaacetate and sodium uramildiacetate. Examples of the anticorrosion agent include acidic sulfites, sodium thiosulfate, ammon thiodiglycolate; diisopropyl ammonium nitrite, pentaerythritol tetranitrate and dicyclohexyl ammonium nitrite. In addition to the above auxiliary agents, a water-soluble UV ray absorber and a water-soluble IR ray absorber may be added depending on the purpose.

The ink set of the present invention includes ink A and ink B. When the ink set is a combination of two inks, one is ink A and the other is ink B. When the ink set a combination of three inks, one is ink A, another is ink B, and the other may contain a colorant having the same anionic group as ink A, may contain the same quaternary ammonium salt as ink B, or may be different from inks A and B. When the ink set a combination of four inks, one is ink A, another is ink B, one of the others may contain a colorant having the same anionic group as ink A, and the other may contain the same quaternary ammonium salt as ink B. In this case, both of the other two inks may contain a colorant having the same anionic group as ink A, may contain the same quaternary ammonium salt as ink B, or may be different from inks A and B.

In the ink used in the present invention, preferably, ink A is a black ink containing self-dispersible colorant A1 made of carbon having an anionic group or is a color ink containing self-dispersible colorant A1 made of organic pigment having an anionic group. In ink B used in the present invention, colorant B1 contained therein is preferably fine particles colored with dye or pigment.

The ink set of the present invention is used in conventional general-use inkjet recording apparatus. In inkjet recording apparatus, ink of ink sets is jetted as fine droplets onto a recording medium from printing nozzles by applying thermal energy, mechanical energy, etc. to form a color image. The recording medium preferably has a Stoeckigt sizing degree as measured according to JIS P-8122 of 3 sec or longer, more preferably 10 sec or longer. The upper limit of the Stoeckigt sizing degree is generally about 100 sec. The ink used in the present invention can be controlled in its physical properties by adjusting the pH thereof. For example, desired storage stability of the ink can be attained by adjusting the pH to 6 or higher. Most copy/letter paper used in offices has a pH of 5 to 6. Onto such recording paper are jetted (at 5 m/s to 20 m/s) ink droplets with a pH of 6 or higher from fine discharge ports (nozzles) (9 μm to 60 μm) under the following conditions: the weight of droplet discharged: 2 ng to 50 ng; and fixing amount (monochrome): 1.5 $g/m^2$ to 30 $g/m^2$. As described above, recording is performed on so-called regular paper with a Stoeckigt sizing degree as measured according to JIS P-8122 of 3 sec or longer, providing a recording method for forming high-quality, high-resolution images. Notably, in the ink with a pH of 9 or higher, its physical properties easily change during storage due to decomposition of the anionic surfactant. Thus, when the anionic surfactant is used, the pH of the ink is preferably adjusted to 6 to 9.

The following describes an example of an inkjet recording apparatus suitable for recording that uses the aqueous ink described above. FIG. 1 shows an example of a configuration of a recording head, which is the main part of the inkjet recording apparatus that uses thermal energy for recording. This drawing is a cross section of head (13) cut along an ink flow path. The head (13) is fabricated by bonding together heat element plate (15) and a glass plate, ceramic plate, silicon plate, plastic plate or the like having ink flow path (nozzle) 14. The heat element plate (15) includes protective layer (16) made of silicon oxide, silicon nitride, silicon carbide or the like, electrodes (17-1) and (17-2) made of aluminum, gold, aluminum-copper alloy or the like, heat resistive element layer (18) made of high-melting-point material such as $HfB_2$, TaN or TaAl, heat storage layer (19) made of thermal silicon oxide, aluminum oxide or the like, and plate (20) formed of heat-releasing material such as silicon, aluminum or aluminum nitride. Application of a pulse-like electric signal to the electrodes (17-1) and (17-2) causes rapid heat generation at the region denoted by (n) in the heat element plate (15), thereby generating an air bubble in a portion of ink (21) that is in contact with that region. This generates pressure that projects meniscus (23), discharging the ink (21) from the nozzle (14) and forming ink drops (24) by means of discharge orifice (22), which fly toward recoding member (25).

Figure 2:
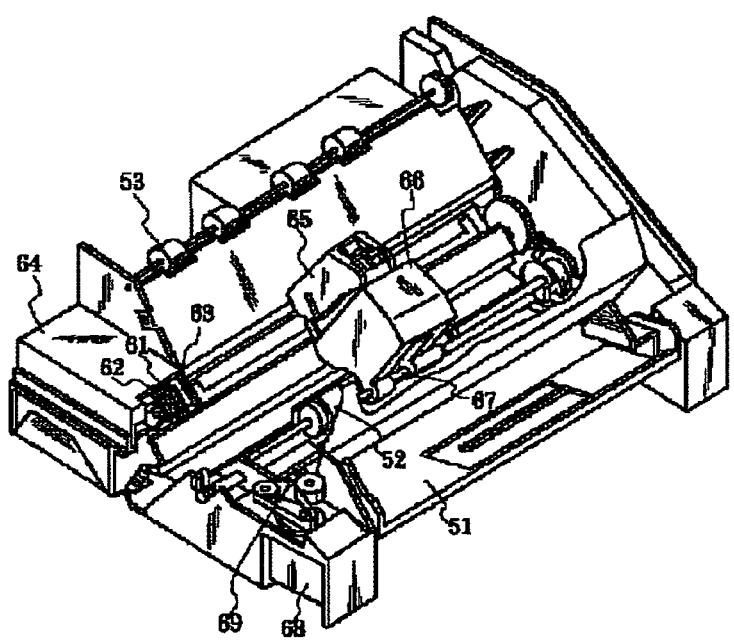
FIG. 2 is a perspective view of an example of an inkjet recording apparatus.

FIG. 2 shows an example of an inkjet recording apparatus having the above-described head incorporated therein. In the drawing reference numeral (61) denotes a blade as a wiping member, one end of which is held by a holding member, forming a cantilever. The blade (61) is positioned adjacent to the recording area by means of the recording head (65). In this example the blade (61) is held in such a way that it is partially exposed in the head move path. Reference numeral (62) denotes a cap for the ink discharge opening of the recording head (65) and is located at a home position adjacent to the blade (61). The cap (62) moves in a direction perpendicular to the movement direction of the recording head (65) and then contacts and caps the ink discharge opening. Reference numeral (63) denotes an ink absorber provided adjacent to the blade (61). As with the blade (61), it is held in such a way that it is partially exposed in the head move path. The blade (61), cap (62) and ink absorber (63) constitute discharge recovery unit (64), and the blade (61) and ink absorber (63) remove water content and dusts from the discharge opening.

The recording head (65) includes a discharge energy generation unit and discharges ink drops toward a recording member placed facing the discharge opening. Reference numeral (66) denotes a carriage that carries and moves the recording head (65). The carriage (66) slidably joints with guide shaft (67), and a part of the carriage (66) is connected to belt (69) (not shown) driven by motor (68). This allows the carriage (66) to move along the guide shaft (67), which in turn allows the recording head (65) to move over the recording region and other nearby regions. Reference numeral (51) denotes a paper feed unit by which a recording medium is fed, and (52) denotes a paper feed roller driven by a motor (not shown). With this configuration, the recording medium is fed into a position facing the discharge opening of the recording head (65). As recording proceeds, the recording medium is ejected to an ejection unit where ejection roller (53) is provided. When the recording head (65) comes back to the home position after finishing recording, while the cap (62) of the discharge recovery unit (64) is escaped from the move path of the recording head (65), the blade (61) remains partially exposed in the move path and thereby wipes the discharge opening of the recording head (65).

When the cap (62) caps the discharge opening of the recording head (65), it moves such that it is partially exposed in the move path of the recording head (65). When the recording head (65) moves from the home position to the recording start position, the positions of the cap (62) and blade (61) are the same as those where the above wiping is carried out. As a consequence, the discharge opening of the recording head (65) is wiped also by this movement. The movement of the recording head toward the home position occurs not only where recording finished or discharge ability recovered, but where the recording head moves over the recording region so that it moves to the homo position at given intervals. The above wiping is carried out in connection with this movement.

Figure 3:
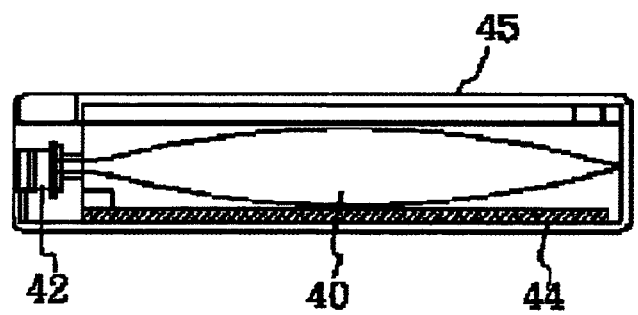
FIG. 3 is a cross sectional view of an example of an ink cartridge.
Figure 4:
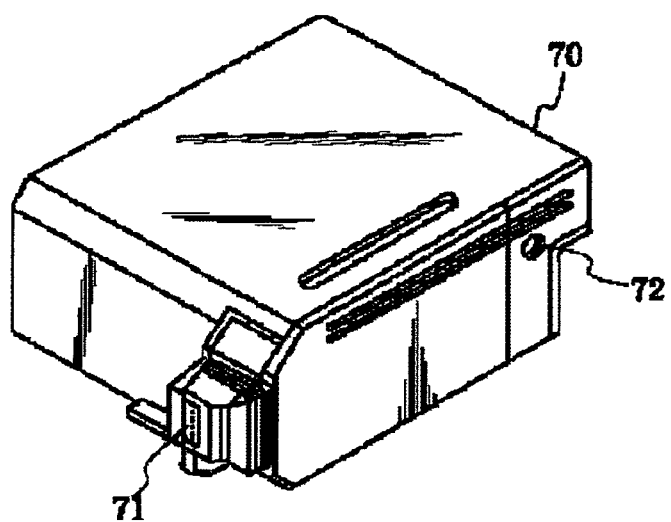
FIG. 4 is a perspective view of another example of an ink cartridge.

FIG. 3 shows an example of an ink cartridge that contains an ink to be supplied to the recording head via an ink supply member such as tube. Reference numeral (40) denotes an ink container containing an ink to be supplied, e.g., an ink bag, which is provided with rubber cap (42) at its top. By insertion of needle (not shown) in the cap (42), the ink in the ink bag (40) flows and is supplied to the recording head. Reference numeral (44) denotes an ink absorber for receiving wasted ink, and (45) denotes a cover. The ink-contacting part of the ink container is preferably made of polyolefin, particularly polyethylene. The inkjet recording apparatus of the present invention is not limited to the one described above, where the head and ink cartridge are separated, but can be a one shown in FIG. 4 where the head and ink cartridge are jointed together. In FIG. 4 reference numeral (70) denotes a recording unit which includes an ink container such as an ink absorber. The ink contained in the ink absorber is discharged as droplets from recording head (71) having multiple orifices. In the present invention it is preferable that the material of the ink absorber be polyurethane, cellulose, polyvinyl acetate, or polyolefin resin. Alternatively, without employing the ink absorber, the ink container may be an ink bag in which a spring or the like is disposed. Reference numeral (72) denotes an air duct through which air comes in and out from the inside of the cartridge. The recording unit (70) can be used in place of the recording head (65) shown in FIG. 2 and is detachably mounted to the carriage (66).

Figure 5:
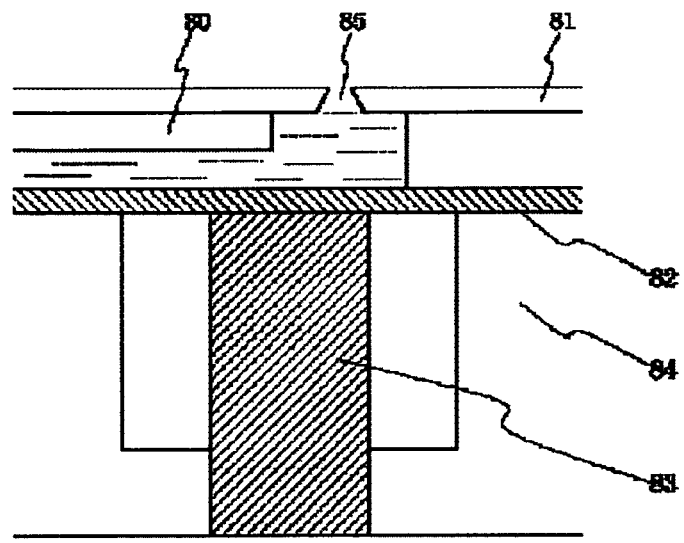
FIG. 5 is a cross sectional view of an example of a recording head.

A preferred example of an inkjet recording apparatus exploiting mechanical energy is an on-demand inkjet recording apparatus that includes a nozzle forming plate having multiple nozzles, a pressure generating element which is provided in parallel with the nozzles and which is made of piezoelectric material conductive material, and an ink provided around the pressure generating element, wherein the pressure generating element is deformed by application of voltage and thereby droplets of the ink are discharged from the nozzles. FIG. 5 shows an example of a configuration of the recording head, which is the main unit of the inkjet recording apparatus. The recoding head includes ink flow path (80) that communicates with an ink chamber (not shown), orifice plate (81) from which a given volume of ink is discharged, vibration plate (82) for directly applying pressure to ink, piezoelectric element (83) connected to the vibration plate (82) and deforms by electric signal, and plate (84) for supporting and stabilizing the orifice plate (81), vibration plate (82) and the like.

In FIG. 5 the ink flow path (80) is made of photosensitive resin or the like, and the orifice plate (81) is fabricated by forming discharge port (85) in a stainless steel or nickel plate by electroforming or pressing. The orifice plate (81) has on its surface an ink repellent layer formed of PTFE/nickel eutectoid plating. The vibration plate (82) is formed of a metal film (e.g., stainless steel, nickel, or titanium film) or resin film with high elasticity. The piezoelectric element (83) is made of barium titanate, or dielectric material such as PZT. The recording head with the configuration described above applies pulse-like voltage to the piezoelectric element (83) to generate strain stress therein, the energy of which deforms the vibration plate connected to the piezoelectric element (83), pressing the ink in the ink flow path (80 in vertical direction to discharge ink droplets (not shown) from the discharge port (85) of the orifice plate (81) for recording. Such an inkjet recording head is incorporated into an inkjet recording apparatus like that shown in FIG. 4. The detailed operation of the inkjet recording apparatus may be the same as that described above.

Figure 6:
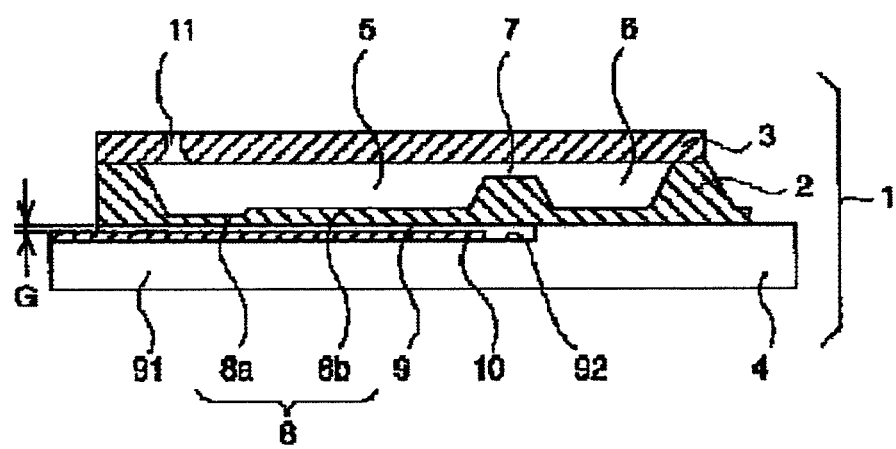
FIG. 6 is a plan view of an inkjet recording apparatus.

As an example of an inkjet recording apparatus exploiting another mechanical energy, an inkjet recording apparatus using a electrostatic actuator will be described below. FIG. 6 shows a cross section of an inkjet head. Inkjet head (1) has three-layer structure in which silicon plate (2) is flanked by silicon nozzle plate (3) (upper plate) and borosilicate glass plate (4) (lower plate) with a thermal coefficient close to that of silicon. In the silicon plate (2) there are provided trenches that serve as separate ink chambers (5), as common ink chamber (6) shared by the ink chambers (5), and as ink supply paths (7) connecting the common chamber (6) to the respective ink chambers (5). These trenches are formed by etching the surface (upper surface in the drawing) of the silicon plate (2). By sealing the trenches with the nozzle plate (3), segments (5), (6) and (7) are defined. The nozzle plate (3) has ink nozzles (11) at positions near one ends of the ink chambers (5). The ink nozzles (11) communicate with the ink chambers (5). The nozzle plate (3) has an ink supply port that communicates with the common ink chamber (6). Ink is supplied from an external ink tank to the common ink chamber (6) through the ink supply port. The ink supplied to the common ink chamber (6) passes through the ink supply paths (7) and is supplied to the respective separate ink chambers (5). In each ink chamber (5) the bottom wall (8) is made thin so that it serves as a diaphragm that can be deformed in vertical directions. Accordingly, for the purpose of simplicity, the bottom wall (8) may be referred to as diaphragm (8) in the following description.

In the borosilicate glass plate (4) that contacts the lower surface of the silicon plate (2), there are provided shallow concaves (9) at positions corresponding to the ink chambers (5) of the silicon plate (2). The concaves (9) are formed by shallow etching of the upper surface of the borosilicate glass plate (4), i.e., the surface bonded to the silicon plate (2). Thus the bottom walls (8) of the ink chambers (5) face surfaces (92) of the concaves (9) of the borosilicate glass plate (4), with minute gaps provided between the bottom walls (8) and surfaces (92). Since the concaves (9) of the borosilicate glass plate (4) face the bottom walls (8) of the ink chambers (5), it is referred to as a vibration plate-facing wall or simply as counter wall (91). The bottom wall (8) of each ink chamber (5) functions as an electrode for storing electric charges. Segment electrodes (10) are formed on the surfaces of the concaves (92) of the borosilicate glass plate (4) in such a way that they face the corresponding bottom walls (8) of the ink chambers (5). The surface of each segment electrode (10) is covered with an insulating layer with a thickness of G0, which is made of inorganic glass. In this way the segment electrodes (10) and bottom walls (8) form counter electrodes, with the insulating layers interposed between them. The distance between the electrode and counter electrode is defined as G. Reference numeral (8a) denotes a thin part of the vibration plate (diaphragm), and (8b) denotes a thick part of the vibration plate (diaphragm).

[Reliability-Maintaining Mechanism]

A reliability-maintaining mechanism used in the present invention will be described. The surface tension of mixed ink means a static surface tension as measured with a method described in, for example, "Nure Gijutsu Handbook-Kiso, Sokuteihyoka, data (Wetting Technology Handbook-Fundamentals, Measurement analysis, and Data) pp. 7, published by Technosystems" using a mixed ink prepared by mixing inks in given proportions. In particular, the surface tension is preferably a surface tension as measured with the Wilhelmy plate method, which surface tension has almost reached equilibrium after one second or longer. Here, "surface tension" means "static surface tension" and shall not be confused with "dynamic surface tension" described above. The adhesion tension of the mixed ink with respect to a waste channel member can be found by measuring the surface tension that can be measured as described above and the contact angle between the ink and waste channel member. The adhesion force can be found using the equation:

$$\text{Adhesion force} = \gamma \cos \theta$$

where $\gamma$ is the static surface tension of mixed ink which can be calculated using the Wilhelmy plate method, and $\theta$ is the contact angle between the ink and waste channel member.

Regarding "mixed ink" described above, mixed ink, particularly mixed ink that lost some water content due to evaporation, offers thixotropic properties. Thus, when a shearing force is applied at a shear rate of $10^3$ (1/s) or more, the ink viscosity decreases and thereby the ink can be readily fluidized. This prevents unwanted ink fixation to the waste channel member and clogging of the channel, thereby ensuring high reliability. As with the surface tension above, the contact angle means a static contact angle described at, for example, page 19 of "Wetting Technology Handbook" described above. In view of less restrictions on the member shape, it is particularly preferable to use a contact angle as measured by the drop method 1 second or longer after dropping. An adhesion tension of greater than 26 mN/m results in increased likelihood of ink retaining in the channel member, leading to deposition of ink solids in the channel. Deposition of ink solids during long-term use results in unwanted clogging of the waste flow path and in poor discharge reliability due to reduced moisture in the discharge nozzle cap. An adhesion tension of less than 15 mN/m may result in increased costs for manufacturing the ink repellent layer of the waste flow path. In the present invention a preferable upper limit of adhesion tension is 18 mN/m.

Examples of the waste flow path include, but not limited to, a discharge nozzle cap, suction tube, and discharge receiver. The ink repellent layer provided on the surface of the waste flow path is made of, for example, silicone resin or fluorine resin. Silicone resins have siloxane bonds as their backbone and are commercially available in various forms, including oil, resin, and elastomer. In addition to ink repellency, they offer various features, including heat resistance, releasing property, antifoaming property, and adhesion property. Broadly, silicone resins are of room temperature-curable type, heat-curable type, and UV-curable type; any type can be selected according to the intended use. The method of formation of a silicone resin-containing ink repellent layer on the surface of the waste channel member includes vacuum deposition of liquid silicone resin, plasma polymerization of silicone oil, coating methods such as spin coating, dipping, spray coating, and electroforming. The thickness of the silicone resin-containing ink repellent layer is preferably 0.1 μm to 5.0 μm, more preferably 0.1 μm to 1.0 μm. If the thickness is less than 0.1 μm, it results in poor durability due to physical contact with other member(s), causing a concern of reduced ink repellency during long-term use. If the thickness is greater than 5.0 μm, it may result in increased manufacturing costs since it is a unnecessarily-thick ink repellent layer.

The adhesion force of mixed ink to the waste channel member is the product of adhesion tension and contact length between the ink and member. By transferring the mixed ink to a waste holdup tank with a force greater than the adhesion force, deposition of ink solids can be prevented. It is only necessary for such a reliability-maintaining mechanism to be a mechanism capable of separating the mixed ink from the waste channel member by means of vibration or rotation of a member, particularly by means of centrifugal force by a rotator in view of space limitations. Alternatively, it is possible to use a waste ink solid recovery mechanism in which the liquid content of mixed ink is removed by vibration or rotation and transferred to a waste holdup tank, and then the remaining ink solid is ejected to the outside of the device. In particular, it is preferable to use a mechanism that use a filter for separating the solid from liquid content by means of centrifugal force of a rotator. The mixed inks described above are effective when used as an ink set that involve aggregation and thickening as a result of mixing, particularly as an ink set of the present invention.

EXAMPLES

The present invention will next be described in more detail by way of examples, which should not be construed as limiting the present invention thereto. Note that "%" in the following Examples refers to "wt. %". Firstly, Preparation Examples of ink are given below.

Preparation Example 1

Preparation of Water-Soluble Polymer Aqueous Solution A

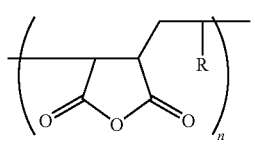

Structural Formula (1)

α-Olefin-maleic anhydride copolymer [I] having the above structural formula (1) (T-YP112, product of Seiko PMC CORPORATION, olefin chain: 20 to 24 carbon atoms, acid value: 190 mgKOH/g, weight average molecular weight: 10,000): 10.0 parts by mass 1N aqueous LiOH solution (1.2 equivalents of the acid value): 17.34 parts by mass Ion-exchange water: 72.66 parts by mass The above components were stirred/mixed with stirrer under heating for dissolving the α-olefin-maleic anhydride copolymer [I] having the above structural formula (1). The resultant mixture was filtered through a 5 μm-filter for removing a trace amount of insoluble matter, to thereby prepare a water-soluble polymer aqueous solution A.

Preparation Example 2

Preparation of Surface-Treated Black Pigment Dispersion

Carbon black (90 g) (CTAB specific surface area: 150 m$^2$/g, DBP oil absorption: 100 mL/100 g) was added to a 2.5N sodium sulfate solution (3,000 mL). The mixture was allowed to react for 10 hours under stirring at 60° C. and 300 rpm to perform an oxidation treatment. After filtration of the reaction mixture, the resultant carbon black was neutralized with a sodium hydroxide solution, followed by ultrafiltration.

The obtained carbon black was washed with water and dried, and then dispersed in pure water so that the solid content is adjusted to 30% by mass. The resultant dispersion was sufficiently stirred to prepare a self-dispersible black pigment dispersion. This pigment dispersoid was found to have an average particle diameter ($D_{50}$) of 103 nm through measurement with a particle size distribution analyzer (Nanotrack UPA-EX150, product of NIKKISO, CO., LTD.).

Preparation Example 3

Preparation of Aqueous Dispersoid of Magenta Pigment-Containing Fine Polymer Particles <Preparation of Polymer Solution A>

A 1 L-flask was equipped with a mechanical stirrer, a thermometer, a nitrogen gas-feeding tube, a refluxing tube and a dropping funnel. The flask was purged sufficiently with nitrogen gas, and then methyl ethyl ketone (40 g) was placed therein. Subsequently, styrene (11.2 g), acrylic acid (2.8 g), lauryl methacrylate (12.0 g), polyethylene glycol methacrylate (4.0 g), styrene macromer (4.0 g) (AS-6, product of TOAGOSEI CO., LTD.) and mercaptoethanol (0.4 g) were mixed with methyl ethyl ketone, and the temperature of the mixture was elevated to 65° C.

Separately, styrene (100.8 g), acrylic acid (25.2 g), lauryl methacrylate (108.0 g), polyethylene glycol methacrylate (36.0 g), hydroxyethyl methacrylate (60.0 g), styrene macromer (36.0 g), mercaptoethanol (3.6 g), azobismethylvaleronitrile (2.4 g) and methyl ethyl ketone (18 g) were mixed with one another to prepare a solution. The solution was added dropwise to the flask over 2.5 hours. After completion of the addition, a solution of azobismethylvaleronitrile (0.8 g) and methyl ethyl ketone (18 g) was added dropwise to the flask over 0.5 hours. After ripening of the mixture for 1 hour at 65° C., azobismethylvaleronitrile (0.8 g) was added thereto, followed by ripening for another 1 hour. After completion of reaction, methyl ethyl ketone (364 g) was added to the flask to prepare 800 g of 50% by mass polymer solution A.

<Preparation of Aqueous Dispersoid of Pigment-Containing Fine Polymer Particles>

Polymer solution A (28 g), C.I. pigment red 122 (42 g), 1 mol/L aqueous potassium hydroxide solution (13.6 g), methyl ethyl ketone (20 g) and ion-exchange water (13.6 g) were sufficiently mixed with one another, and the mixture was kneaded with a roll mill. The obtained paste was charged into pure water (200 g), followed by sufficiently stirring. The resultant mixture was evaporated with an evaporator to remove methyl ethyl ketone and water. The obtained dispersion was subjected to pressure filtration using a polyvinylidene fluoride membrane filter with an average pore size of 5.0 μm for removing coarse particles, to thereby prepare an aqueous dispersoid of magenta fine polymer particles (pigment: 15% by mass, solid content: 20% by mass). This pigment dispersoid was found to have an average particle diameter ($D_{50}$) of 127 nm through measurement with a particle size distribution analyzer (Nanotrack UPA-EX150, product of NIKKISO, CO., LTD.).

Preparation Example 4

Preparation of Dispersoid of Cyan Pigment-Containing Fine Polymer Particles

The procedure of Preparation Example 3 was repeated, except that the pigment red 122 was changed to a copper phthalocyanine pigment, to thereby prepare a dispersoid of cyan fine polymer particles.

The obtained fine polymer particles were found to have an average particle diameter ($D_{50}$) of 93 nm through measurement with a particle size distribution analyzer (Nanotrack UPA-EX150, product of NIKKISO, CO., LTD.).

Preparation Example 5

Preparation of Dispersoid of Yellow Pigment-Containing Fine Polymer Particles The procedure of Preparation Example 3 was repeated, except that the pigment red 122 was changed to pigment yellow 74, to thereby prepare a dispersoid of yellow fine polymer particles. The obtained fine polymer particles were found to have an average particle diameter ($D_{50}$) of 76 nm through measurement with a particle size distribution analyzer (Nanotrack UPA-EX150, product of NIKKISO, CO., LTD.).

Preparation Example 6

Preparation of Aqueous Dispersoid of Carbon Black-Containing Fine Polymer Particles The procedure of Preparation Example 3 was repeated, except that the pigment red 122 was changed to carbon black (FW100, product of Degussa Co.), to thereby prepare a dispersoid of black fine polymer particles.

The obtained fine polymer particles were found to have an average particle diameter ($D_{50}$) of 104 nm through measurement with a particle size distribution analyzer (Nanotrack UPA-EX150, product of NIKKISO, CO., LTD.).

Preparation Example 7

Preparation of Surfactant Dispersoid of Yellow Pigment

Monoazo yellow pigment: 30.0 parts by mass (C.I. pigment yellow 74, product of Dainichiseika Color & Chemicals Mfg. Co., Ltd.)
Polyoxyethylenestyrene phenyl ether: 10.0 parts by mass (Noigen EA-177, product of Daiichi Kogyo Seiyaku Co., Ltd., nonionic surfactant, HLB value: 15.7)
Ion-exchange water: 60.0 parts by mass
Firstly, the above surfactant was dissolved in ion-exchange water, and the above pigment was mixed with the solution, followed by sufficiently wetting. The resultant mixture was dispersed with a wet disperser (DYNO-MILL KDL Type-A, product of WAB Inc.), which had been packed with zirconium beads each having a diameter of 0.5 mm, at 2,000 rpm for 2 hours, to thereby prepare a primary pigment dispersoid.

Subsequently, water-soluble polyurethane resin (Takerac W-5661, product of MITSUI TAKEDA CHEMICALS, INC., active ingredient: 35.2% by mass, acid value: 40 mgKOH/g, molecular weight: 18,000) (4.26 parts by mass) serving as a water-soluble polymer aqueous solution was added to the primary pigment dispersoid, followed by sufficiently stirring, to thereby prepare a surfactant dispersion of yellow pigment. The obtained pigment dispersoid was found to have an average particle diameter ($D_{50}$) of 62 nm through measurement with a particle size distribution analyzer (Nanotrack UPA-EX150, product of NIKKISO, CO., LTD.).

Preparation Example 8

Preparation of Surfactant Dispersion of Magenta Pigment

Quinacrydone pigment: 30.0 parts by mass (C.I. pigment red 122, product of Dainichiseika Color & Chemicals Mfg. Co., Ltd.)
Polyoxyethylene-β-naphthyl ether: 10.0 parts by mass (RT-100, product of TAKEMOTO Oil & Fat Co., Ltd., nonionic surfactant, HLB value: 18.5)
Ion-exchange water: 60.0 parts by mass
Firstly, the above surfactant was dissolved in ion-exchange water, and the above pigment was mixed with the solution, followed by sufficiently wetting. The resultant mixture was dispersed with a wet disperser (DYNO-MILL KDL Type-A, product of WAB Inc.), which had been packed with zirconium beads each having a diameter of 0.5 mm, at 2,000 rpm for 2 hours, to thereby prepare a primary pigment dispersoid.

Subsequently, a water-soluble styrene-(meth)acrylic copolymer (JC-05, product of Seiko PMC CORPORATION, active ingredient: 21% by mass, acid value: 170 mgKOH/g, weight average molecular weight: 16,000) (7.14 parts by mass) was added to the primary pigment dispersoid, followed by sufficiently stirring, to thereby prepare a surfactant dispersion of magenta pigment. The obtained pigment dispersoid was found to have an average particle diameter ($D_{50}$) of 83 nm through measurement with a particle size distribution analyzer (Nanotrack UPA-EX150, product of NIKKISO, CO., LTD.).

Preparation Example 9

Preparation of Surfactant Dispersion of Cyan Pigment A

Phthalocyanine pigment: 30.0 parts by mass (C.I. pigment blue 15:3, product of Dainichiseika Color & Chemicals Mfg. Co., Ltd.)
Polyoxyethylenestyrene phenyl ether: 10.0 parts by mass (Noigen EA-177, product of Daiichi Kogyo Seiyaku Co., Ltd., nonionic surfactant, HLB value: 15.7)
Ion-exchange water: 60.0 parts by mass
Firstly, the above surfactant was dissolved in ion-exchange water, and the above pigment was mixed with the solution, followed by sufficiently wetting. The resultant mixture was dispersed with a wet disperser (DYNO-MILL KDL Type-A, product of WAB Inc.), which had been packed with zirconium beads each having a diameter of 0.5 mm, at 2,000 rpm for 2 hours, to thereby prepare a primary pigment dispersoid.

The water-soluble polymer aqueous solution A prepared in Preparation Example 1 (7.51 parts by mass) and water-soluble polyester resin (NICHIGO POLYESTER W-0030, product of NIPPON GOSEI KAGAKU CO., LTD., active ingredient: 29.9% by mass, acid value: 100 mgKOH/g, weight average molecular weight: 7,000) (2.51 parts by mass) was added to the primary pigment dispersoid, followed by sufficiently stirring, to thereby prepare a surfactant dispersion of cyan pigment A. The obtained pigment dispersoid was found to have an average particle diameter ($D_{50}$) of 78 nm through measurement with a particle size distribution analyzer (Nanotrack UPA-EX150, product of NIKKISO, CO., LTD.).

Example 1

Ink Set 1

[Black Ink 1]
(1) The following components were mixed with one another, and the mixture was filtered with a 0.45 μm-Teflon (registered trademark) (polytetrafluoroethylene) filter, to thereby prepare black ink 1.
Surface-treated black pigment dispersion prepared in Preparation Example 2 (water-dispersible colorant A1): 30%
Water-soluble dye C.I. acid red 52 (anionic compound A2): 1%
Acrylic-silicone resin emulsion (solid content: 40%): 24%
Dipropylene glycol: 20%
Glycerol: 10%
2-Ethyl-1,3-hexanendiol: 2%
Fluorine surfactant Zonyl FS-300 (product of DuPond): 1%
Dehydro sodium acetate: 0.2%
Ion-exchange water: balance
[Yellow Ink 1]
(2) The procedure (1) of <Ink set 1> was repeated, except that the following components were used, to thereby prepare yellow ink 1.
Surfactant dispersion of yellow pigment prepared in Preparation Example 7 (water-dispersible colorant B1): 14%
Acrylic-silicone resin emulsion (solid content: 40%): 24%
1,3-Butanediol: 24%
Glycerol: 8%

1,2-Hexanediol: 1%
Softanol EP-7025 (product of NIPPON SHOKUBAI CO., LTD.): 1%
Ion-exchange water: balance
[Magenta Ink 1]
(3) The procedure (1) of <Ink set 1> was repeated, except that the following components were used, to thereby prepare magenta ink 1.
Surfactant dispersion of magenta pigment prepared in Preparation Example 8 (water-dispersible colorant B1): 29%
Acrylic-silicone resin emulsion (solid content: 40%): 24%
1,3-Butanediol: 24%
Glycerol: 8%
1,2-Hexanediol: 1%
Softanol EP-7025 (product of NIPPON SHOKUBAI CO., LTD.): 1%
Ion-exchange water: balance
[Cyan Ink 1]
(4) The procedure (1) of <Ink set 1> was repeated, except that the following components were used, to thereby prepare cyan ink 1.
Surfactant dispersion of cyan pigment prepared in Preparation Example 9 (water-dispersible colorant B1): 15%
Acrylic-silicone resin emulsion (solid content: 40%): 24%
1,3-Butanediol: 24%
Glycerol: 8%
1,2-Hexanediol: 1%
Softanol EP-7025 (product of NIPPON SHOKUBAI CO., LTD.): 1%
Ion-exchange water: balance Example 2

Ink Set 2

[Black Ink 2]
(1) The procedure (1) of <Ink set 1> was repeated, except that the following components were used, to thereby prepare black ink 2.
Aqueous dispersoid of carbon black-containing fine polymer particles prepared in Preparation Example 6 (water-dispersible colorant A1): 45%
Water-soluble dye C.I. acid blue 9 (anionic compound A2): 1%
Acrylic-silicone resin emulsion (solid content: 40%): 24%
Glycerol: 25%
2-Ethyl-1,3-hexanediol: 2%
2-Butyl-2-ethyl-1,3-β-hydroxyethoxypropane: 1%
Silicone surfactant KF643 (product of Shin-Etsu Chemical Co., Ltd.): 2%
[Yellow Ink 2]
(2) The procedure (1) of <Ink set 1> was repeated, except that the following components were used, to thereby prepare yellow ink 2.
Surfactant dispersion of yellow pigment prepared in Preparation Example 7 (water-dispersible colorant B1): 14%
Acrylic-silicone resin emulsion (solid content: 40%): 24%
Glycerol: 25%
2-Ethyl-1,3-hexanediol: 2%
2-Butyl-2-ethyl-1,3-β-hydroxyethoxypropane: 1%
Silicone surfactant KF643 (product of Shin-Etsu Chemical Co., Ltd.): 2%
Ion-exchange water: balance
[Magenta Ink 2]
(3) The procedure (1) of <Ink set 1> was repeated, except that the following components were used, to thereby prepare magenta ink 2.
Surfactant dispersion of magenta pigment prepared in Preparation Example 8 (water-dispersible colorant B1): 29%
Acrylic-silicone resin emulsion (solid content: 40%): 24%
Acid red 52 (AR52): 0.5%
Glycerol: 25%
2-Ethyl-1,3-hexanediol: 2%
2-Butyl-2-ethyl-1,3-β-hydroxyethoxypropane: 1%
Silicone surfactant KF643 (product of Shin-Etsu Chemical Co., Ltd.): 2%
Ion-exchange water: balance
[Cyan Ink 2]
(4) The procedure (1) of <Ink set 1> was repeated, except that the following components were used, to thereby prepare cyan ink 2.
Surfactant dispersion of cyan pigment prepared in Preparation Example 9 (water-dispersible colorant B1): 15%
Acrylic-silicone resin emulsion (solid content: 40%): 24%
Glycerol: 25%
2-Ethyl-1,3-hexanediol: 2%
2-Butyl-2-ethyl-1,3-β-hydroxyethoxypropane: 1%
Silicone surfactant KF643 (product of Shin-Etsu Chemical CO., Ltd.): 2%
Ion-exchange water: balance Comparative Example 1

The procedure of Example 1 (<Ink set 1>) was repeated, except that water-soluble dye C.I. acid red 52 (anionic compound A2) was not used in black ink 1, to thereby prepare ink set 3.

Comparative Example 2

The procedure of Example 2 (<Ink set 2>) was repeated, except that the pigment dispersion of yellow ink 2 was changed to the dispersoid of yellow pigment-containing fine polymer particles prepared in Preparation Example 5, that the pigment dispersion of magenta ink 2 was changed to the dispersoid of magenta pigment-containing fine polymer particles prepared in Preparation Example 3, and that the pigment dispersion of cyan ink 2 was changed to the dispersoid of cyan pigment-containing fine polymer particles prepared in Preparation Example 4, to thereby prepare ink set 4.

The above-prepared ink sets of Examples 1 and 2 and Comparative Examples 1 and 2 were tested as follows.
(1) Sharpness of Image
By use of a thermal inkjet printer (nozzle diameter: 18 μm (for each color), 300 nozzles (600 dpi pitch)), an inkjet printer using multilayer PZTs for pressurizing chamber channels (nozzle diameter: 28 μm (for each color), 300 nozzles (200 dpi pitch)), and an inkjet printer using electostatic actuators for pressurizing chamber channels (300 nozzles for each color), printing was performed using each ink set for visually evaluating bleeding at boundaries between two different colors, image bleeding, color tone, and color density. The printing paper used was as follows: commercially available recycle paper (product of NBS Ricoh, PPC paper Type A): 18 sec, woodfree paper (product of NBS Ricoh, My Paper): 23 sec, bond paper (product of Mead Co., Gilbert Bond (25% cotton paper))=31 sec, and gross-coated paper (product of Ricoh, Ricoh Business coat gross 100): >70 sec.

<Evaluation Rank>

On the all types of paper, no bleeding at boundaries between two different colors, high image density, high sharpness, and high color reproducibility observed: 5

On the all types of paper, no bleeding at boundaries between two different colors, slightly low image density, high sharpness, and high color reproducibility observed: 4

Less bleeding at color boundaries observed and, on some types of paper, ununiformity, etc. in secondary color observed: 3

On some types of paper, bleeding at color boundaries observed: 2

On some types of paper, bleeding at color boundaries, low image density, and low sharpness observed: 1

(2) Water Resistance of Image

Each of the above-formed image samples was measured for its image density using X-Rite938. After immersed in water (30° C.) for 1 min, the sample was measured again for its image density similarly. Using the obtained values, the water resistance (color retentability %) of the sample was calculated from the following equation.

$$\text{Color retentability}(\%) = [1 - (\text{treated-image density})/(\text{untreated-image density})] \times 100 \quad \text{Equation 1}$$

<Evaluation Rank>

In any paper,

10% or less: 5,

20% or less: 4, less than 30%: 3,

30% or more: 2, and

50% or more: 1.

(3) Dry Speed of Image

Filter paper was pressed against each of the printed images under certain conditions, and time required that no transfer of ink onto the filter paper be observed was measured.

<Evaluation Rank>

In any paper, time required for drying within 10 sec: A, and time required for drying over 10 sec: B.

(4) Storage Stability

The ink sets 1 were individually stored in a polyethylene container at −20° C., 5° C., 20° C., and 70° C. for 3 months. Similarly, the ink sets 2 to 4 were stored. After storage, each ink set was measured for its surface tension, viscosity and particle diameter, and evaluated for formation of precipitants.

<Evaluation Rank>

Under any conditions, no change in physical properties, etc. observed: A (5) Reliability after Downtime The reliability was evaluated using a printer with heads driven by PZTs (nozzle diameter: 30 μm, 128 nozzles) on the basis of the discharge ability after downtime (during operation, no treatments such as capping and cleaning had been performed), the degree of jet-direction deviation over time, and change in the weight of a droplet discharged. The results are shown in Table 1.

<Evaluation Rank>

No problem: 5

Small change in the droplet weight and allowable jet-direction deviation: 4

Small jet-direction deviation: 3

Large change in the droplet weight, but not clogging: 2

Considerably clogging: 1

TABLE 1

|  | Sharpness of image | Water resistance of image | Dry speed of image | Storage ability of ink | Discharge reliability |
|---|---|---|---|---|---|
| Ex. 1 | 5 | 4 | A | A | 5 |
| Ex. 2 | 5 | 5 | A | A | 4 |
| Comp. Ex. 1 | 2 | 4 | A | A | 5 |
| Comp. Ex. 2 | 2 | 5 | A | A | 4 |

DISCUSSION OF EFFECTS OF THE PRESENT INVENTION

The present invention can provide an ink set having inks A and B, wherein the ink A contains water-dispersible colorant A1 free of a surfactant-based dispersant, and anionic compound A2, and wherein the ink B contains water-dispersible colorant B1 containing a surfactant-based dispersant, the ink set being capable of high-speed printing of a sharp, high-resolution color image that has no outstanding bleeding at boundaries between different colors on regular paper having remarkably poor ink absorbability or on a coating medium with no aqueous ink-receiving layer.

The present invention can provide an ink set having excellent storage stability and discharge reliability, by using ink A containing water-dispersible colorant A1 which is a polymer emulsion in which a water-insoluble coloring material and/or poor water-soluble coloring material is contained in fine polymer particles.

The present invention can provide an ink set that produces less bleeding at boundaries between black and color by using, as black ink, ink A that contains an aqueous dye as anionic compound A2, and as color ink, ink B. In addition, upon printing of black, color ink B is used in addition to black ink A, thereby providing a black image with excellent edge sharpness while ensuring ink dry speed.

The present invention can provide an ink set suitable for the formation of color image on regular paper by using a preferable combination of colorants for the ink set.

The present invention can ensure excellent image formation on regular paper by using inks in which the solid content, wetting agent amount, and solid content of water-dispersible resin with respect to colorants are specified so that the colorants tend to remain on the paper surface.

The present invention can provide an ink set with high reliability by using a specific wetting agent suitable for improving storage stability and discharge stability.

The prevent invention uses a specific type of surfactant suitable for improving wettability to paper, ensuring excellent image formation even on regular paper with remarkably poor ink absorbability or on a coating medium with no aqueous ink-receiving layer.

The prevent invention adds an organic solvent suitable for improving wettability to paper and imparting permeability, ensuring excellent image formation even on regular paper with remarkably poor ink absorbability or on a coating medium with no aqueous ink-receiving layer.

The inkjet recording method of the present invention uses the above ink set and thus can achieve high-speed printing of high-quality color image in which secondary colors are reproduced with high fidelity.

The present invention can provide an ink cartridge and inkjet recording apparatus, which include therein the above ink set and which are capable of high-speed color formation in which secondary colors are reproduced with high fidelity.

The invention claimed is:

1. An ink set comprising:
   at least two aqueous inks A and B having different colors,
   wherein the ink A comprises a water-dispersible colorant A1 free of a surfactant-based dispersant, and an anionic compound A2,
   wherein the ink B comprises a water-dispersible colorant B1 comprising a surfactant-based dispersant, and
   wherein at least one ink selected from the group consisting of ink A and ink B further comprises:
   a water-dispersible resin,
   a wetting agent,
   a penetrating agent, and
   water,
   wherein a total amount of the water-dispersible colorant and the water-dispersible resin in the ink is 12% by mass to 40% by mass on a solid basis, an amount of the wetting agent in the ink is 20% by mass to 35% by mass, and a ratio of a solid content R of the water-dispersible resin to a solid content P of a pigment in the water-dispersible colorant, R/P, is 0.5 to 8.

2. The ink set according to claim 1, wherein the colorant A1 is a water-insoluble self-dispersible coloring material.

3. The ink set according to claim 1, wherein the colorant A1 is a polymer emulsion comprising fine polymer particles comprising a water-insoluble coloring material.

4. The ink set according to claim 2, wherein the colorant A1 is a polymer emulsion comprising a water-insoluble self-dispersible pigment.

5. The ink set according to claim 1, wherein the ink A is a black ink, the anionic compound A2 is a water-soluble dye, and the ink B is a color ink.

6. The ink set according to claim 1, wherein the inks A and B undergo aggregation when homogenously mixed and retained at 25° C. for 60 minutes.

7. The ink set according to claim 1, wherein the penetrating agent comprises at least one surfactant selected from the group consisting of an acetylene glycol-based surfactant, a polyoxyethylene alkyl ether-based surfactant, a polyoxyethylene alkylphenyl ether-based surfactant, a fluorine-based surfactant, and a silicone-based surfactant.

8. An inkjet recording method comprising discharging the ink set of claim 1 onto a recording medium, to obtain a color image, wherein the inks A and B are superimposed on the recording medium.

9. The inkjet recording method according to claim 8, wherein the recording medium has a Stoeckigt sizing degree of 3 seconds or more.

10. The inkjet recording method according to claim 8, wherein ink discharge is carried out by applying thermal energy to the ink.

11. The inkjet recording method according to claim 8, wherein ink discharge is carried out by applying mechanical energy to the ink.

12. An inkjet recording apparatus comprising an ink container comprising the ink set of claim 1.

13. The inkjet recording apparatus according to claim 12, wherein a mixed ink, prepared by mixing the inks of the ink set, has a surface tension $\gamma$ of 30 mN/m or less, and an adhesion tension $\gamma \cos \theta$ of the mixed ink with respect to a waste channel member through which the mixed ink is transferred to a waste holdup tank satisfies the relationship $15 \leqq \gamma \cos \theta \leqq 26$, where $\gamma$ is the surface tension of the mixed ink, and $\theta$ is the contact angle between the mixed ink and the waste channel member.

14. The inkjet recording apparatus according to claim 13, wherein the waste channel member has on its surface an ink repellant layer comprising a silicone resin or fluorine resin.

15. The inkjet recording apparatus according to claim 13, further comprising a reliability-maintaining mechanism for transferring the mixed ink to the waste holdup tank with a force greater than the adhesion force derived from the adhesion tension.

16. The inkjet recording apparatus according to claim 15, wherein the waste channel member of the reliability-maintaining mechanism is a rotator, and the mixed ink is separated from the waste channel member by means of the centrifugal force of the rotator.

17. The inkjet recording apparatus according to claim 15, wherein the reliability-maintaining mechanism fluidizes the mixed ink at a shear rate of $10^3$ (1/s) or more and transfers the fluidized mixed ink to the waste holdup tank.

18. The inkjet recording apparatus according to claim 13, further comprising a waste ink solid recovery mechanism in which a liquid content of the mixed ink is removed using a filter, and then a remnant containing solids is ejected to the outside of the inkjet recording apparatus.

* * * * *